US005633894A

United States Patent [19]
Snelgrove et al.

[11] Patent Number: 5,633,894
[45] Date of Patent: May 27, 1997

[54] CIRCUIT FOR MODULATING A SINUSOIDAL WAVEFORM SIGNAL USING DIGITAL PULSE SHAPING

[75] Inventors: Andrew H. Snelgrove; Anthoney V. Cirineo; Eugene L. Law, all of Ventura, Calif.

[73] Assignee: The United States of America as represented by the Secretary of the Navy, Washington, D.C.

[21] Appl. No.: 378,753

[22] Filed: Jan. 26, 1995

[51] Int. Cl.$^6$ ................................................ H04L 27/12
[52] U.S. Cl. ............................................ 375/307; 375/303
[58] Field of Search ........................ 375/303, 305–307, 375/272, 274; 332/100; 364/238.4

[56] References Cited

U.S. PATENT DOCUMENTS

| | | | |
|---|---|---|---|
| 4,442,530 | 4/1984 | Parrish, Jr. et al. | 375/308 |
| 4,686,688 | 8/1987 | Chung et al. | 375/305 X |
| 5,016,259 | 5/1991 | Hershberger | 375/296 |
| 5,255,288 | 10/1993 | Ichihara | 375/305 |
| 5,398,031 | 3/1995 | Saji | 375/306 X |
| 5,483,554 | 1/1996 | Chauvel et al. | 375/303 |

*Primary Examiner*—Young T. Tse
*Attorney, Agent, or Firm*—David S. Kalmbaugh; Melvin J. Sliwka

[57] ABSTRACT

An electronics circuit for frequency shift keying a continuous-running carrier, such as a sinewave, which allows the user to vary two closely spaced frequencies from a personal computer. The electronics circuit of the present invention comprises a microcontroller which has stored therein a lower frequency and an offset frequency. After the electronics circuit is powered up the microcontroller enters the MAIN program and generates control and address signals to effect a transfer of thirty two data bits representing the lower frequency from the microcontroller to a pair of eight bit RAMS. A programmed array logic device, which receives addresses from the microcontroller, decodes the addresses and then provides chip select and output enable signals to the RAMs to allow the thirty two data bits to be written into the RAMs with the write signal being provided by the microcontroller.

7 Claims, 10 Drawing Sheets

Fig. 1b.

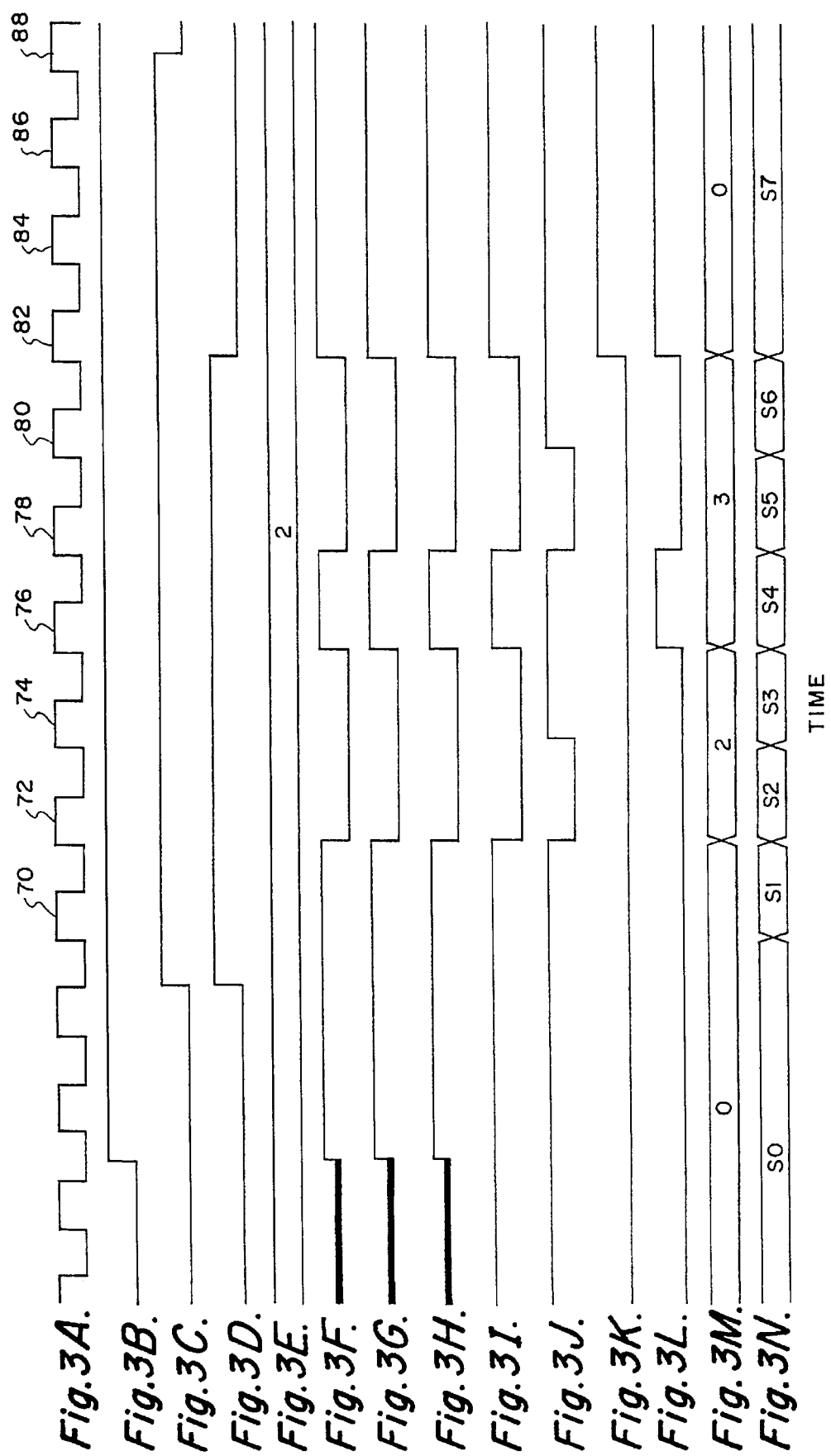

CIRCUIT FOR MODULATING A SINUSOIDAL WAVEFORM SIGNAL USING DIGITAL PULSE SHAPING

BACKGROUND OF THE INVENTION

1. Field of the Invention

The present invention relates generally to modulating circuitry. In particular, the present invention to an electronics circuit for modulating a sinusoidal waveform signal using digital pulse shaping.

2. Description of the Prior Art

Communications systems have evolved over the years to utilize numerous modulation techniques for modulation a carrier signal. These modulation techniques range from amplitude to frequency and phase modulation.

The transmission of digital data over communication circuits is an important aspect of many modern electronic communication systems. These systems include computers, data processing equipment, modems and many other devices which must frequently be interconnected over existing voice grade communication facilities such as telephone lines, satellite links and the like. However, the transmission characteristics of existing voice grade communication facilities are often not suitable for the direct transmission of the signals in a form most efficiently processed by these modern electronic communication systems. For example, high frequency components of digital data signals are beyond the transmission capability of a number of existing voice grade communication facilities. Thus, there arises a need for converting the binary data signal which is most efficiently used by these electronic systems into a signal that is compatible with existing transmission systems.

There have been developed over the years many modulation techniques for the efficient transmission of digital data over existing transmission systems. One modulation technique for the transmission of digital data that has found wide spread acceptance is frequency shift key (FSK) wherein a number of signals, usually two when a binary system is used, having separate discrete audio frequencies compatible with the transmission are each assigned a separate, different symbol identification portion of the data signal. For example, in a mark-space data signal, the mark is assigned a first frequency while the space is assigned the second frequency. In these FSK systems the frequency of the signal to be transmitted is shifted from the first frequency to the second frequency as a function of the mark and space symbol identification in the data signal.

When high frequency and radio frequency signals are used to transmit digital data signals frequency shift keying is employed to shift a continuous-running carrier in frequency between two closely spaced frequencies according to the ones and zeros being transmitted with 850 hertz of shift being a typical value. The use of frequency shift keying to transmit digital data is extremely efficient and effective in the presence of large signal fading from changing propagation conditions.

While there are many devices in the prior art to shift a continuous-running carrier in frequency between two closely spaced frequencies, none of these prior art devices allow the user to change the two closely spaced frequencies of the continuous carrier by using a personal computer or the like. In addition, it would be very desirable to allow the user of a system for frequency shift keying a continuous-running carrier to efficiently trouble shot the system through use a personnel computer.

SUMMARY OF THE INVENTION

The present invention overcomes some of the disadvantages of the prior art, including those mentioned above, in that it comprises an electronics circuit for frequency shift keying a continuous-running carrier, such as a sinewave, which allows the user to vary two closely spaced frequencies from a personal computer. In addition, the present invention allows the user to trouble shoot each logic element of the electronics circuit from his or her personal computer.

The electronics circuit of the present invention comprises a microcontroller which has stored therein the lower frequency and the offset frequency for frequency shift keying a continuous-running carrier, such as a sinewave. After the electronics circuit is powered up the microcontroller enters the MAIN program and generates control and address signals to effect a transfer of thirty two data bits representing the lower frequency from the microcontroller to a pair of eight bit RAMS. A programmed array logic device, which receives addresses from the microcontroller, decodes the addresses and then provides chip select and output enable signals to the RAMs to allow the thirty two data bits to be written into the RAMs with the write signal being provided by the microcontroller.

The microcontroller deasserts control of the RAMS and then provides a manual load signal to an oscillator data and control circuit to initiate a direct memory access data transfer of the thirty two data bits from the RAMs to a sixteen bit numerically controlled oscillator. The oscillator data and control circuit provides the control signals to the RAMs and the numerically controlled addressing to effect the direct memory access data transfer of the thirty two data bits representing the lower frequency from the RAMs to the oscillator.

After the transfer of the thirty two bits representing the lower frequency is complete, the microcontroller transfers the thirty data representing the offset frequency from the microcontroller to the RAMs. The oscillator data and control circuit then initiates and provides control signals to effect a direct memory access data transfer of the thirty two data bits representing the offset frequency from the RAMs to the numerically controlled oscillator.

After the center and offset frequencies are loaded into the numerically controlled oscillator, the microcontroller provides an output enable sinewave signal which enables the digital outputs of the oscillator resulting in a digitized sinewave signal at these outputs. A serial binary data stream of logic ones and zeros from an external source is also supplied to the oscillator. Whenever a data bit of the data stream is a logic zero the digitized sinewave signal provided by the oscillator has a frequency equal to the lower frequency. Similarly, whenever a data bit of the data stream is a logic one the digitized sinewave signal provided by the oscillator has a frequency equal to the lower frequency plus the offset frequency. The digitized sinewave signal is converted to an analog signal by a digital to analog converter.

The user of the present invention can load a new lower frequency and a new offset frequency by using a personal computer since the microcontroller has a debug program which is accessed from the personal computer. The debug program also allows the user to test and when necessary replace each logic element of the electronics circuit.

BRIEF DESCRIPTION OF THE DRAWINGS

FIGS. 1a–1f are an electrical schematic diagram illustrating the circuit for modulating a sinusoidal waveform signal using digital pulse shaping which constitutes the present invention;

FIGS. 3A–3N illustrate some of the timing waveforms occurring during a direct memory access transfer of data from the RAMs of FIG. 1b to the sixteen bit numerically controlled oscillator of FIG. 1d.

DETAILED DESCRIPTION OF THE PREFERRED EMBODIMENT

Figure 1A:
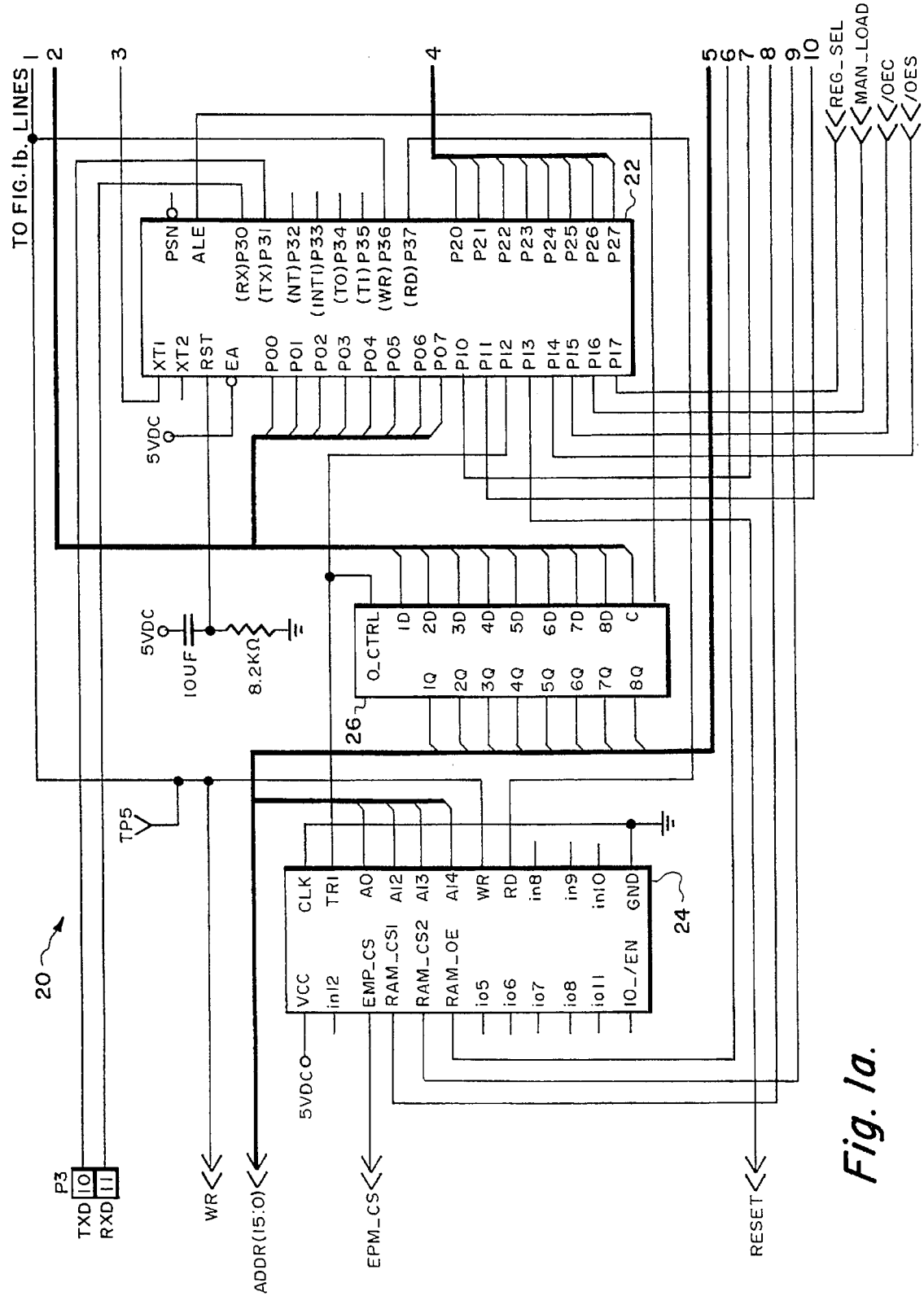
Figure 1B:
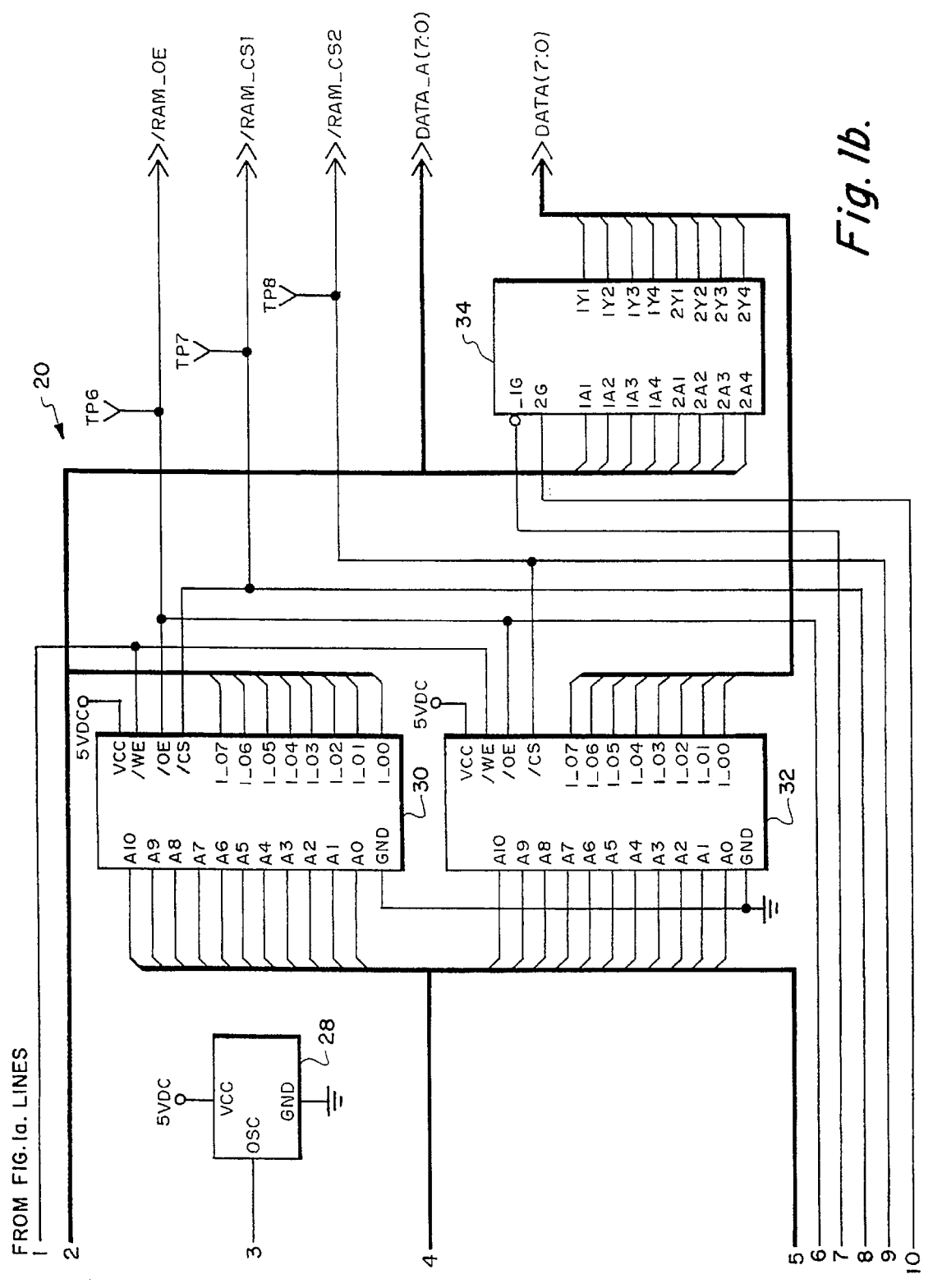
Figure 1C:
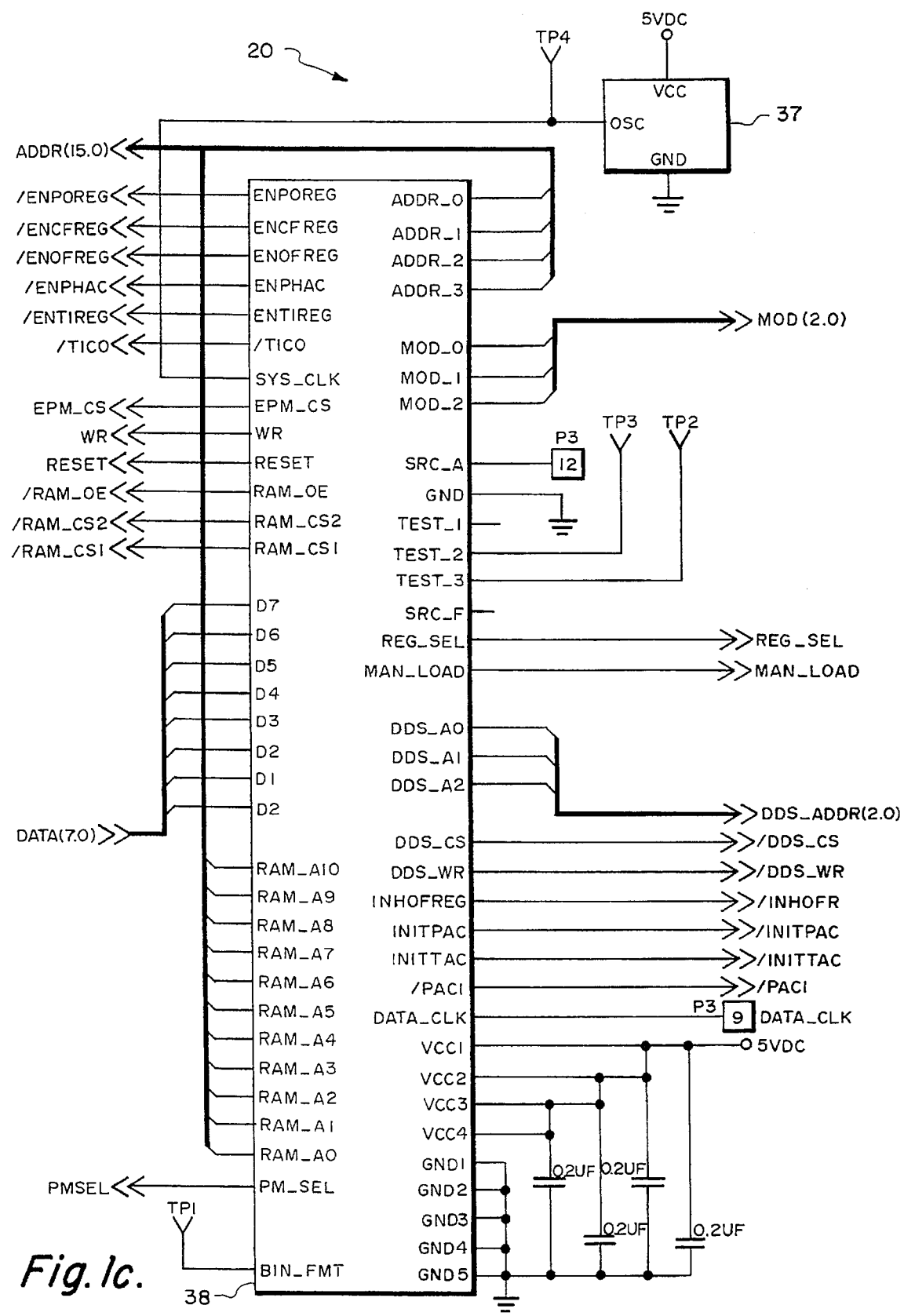
Figure 1D:
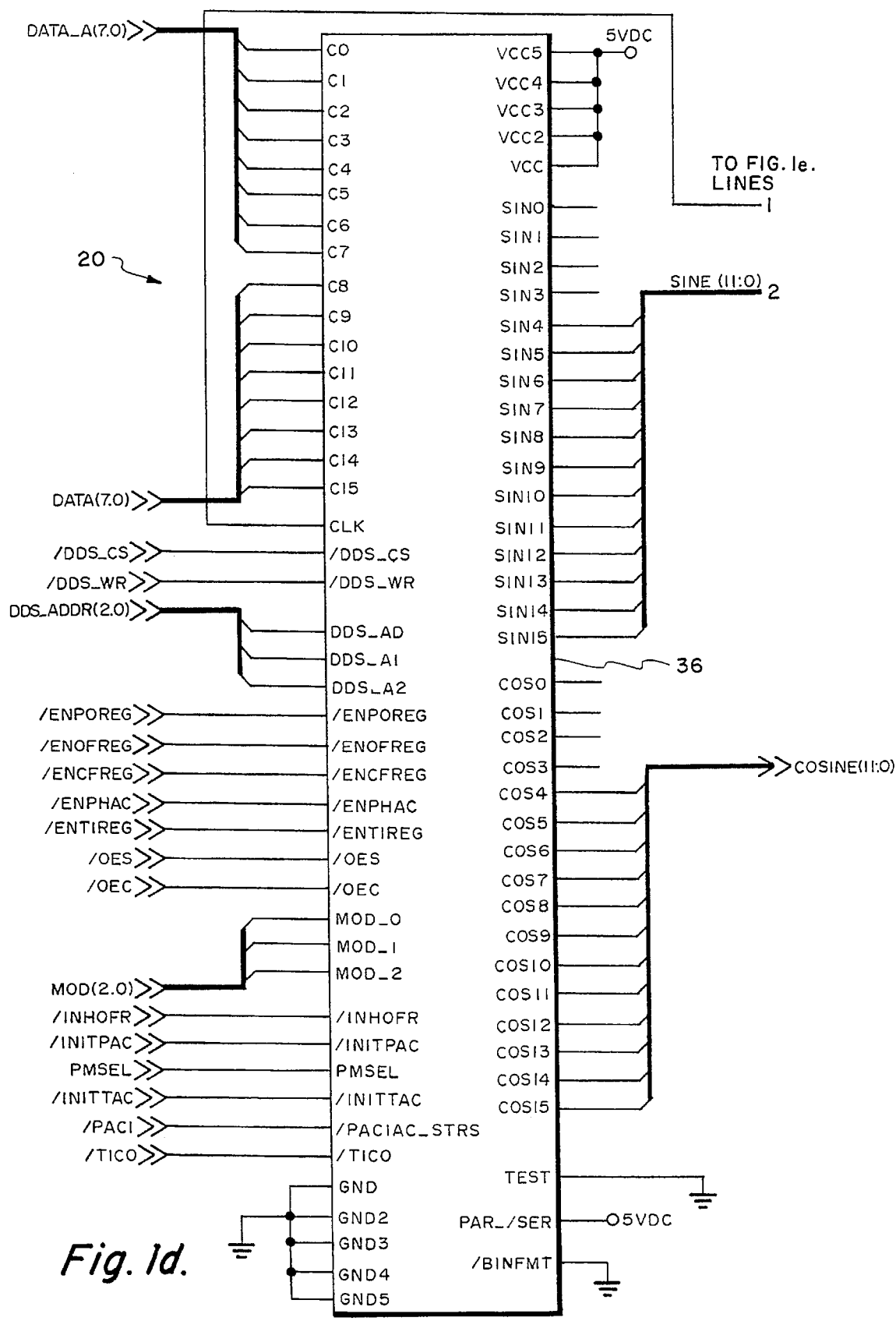
Figure 1E:
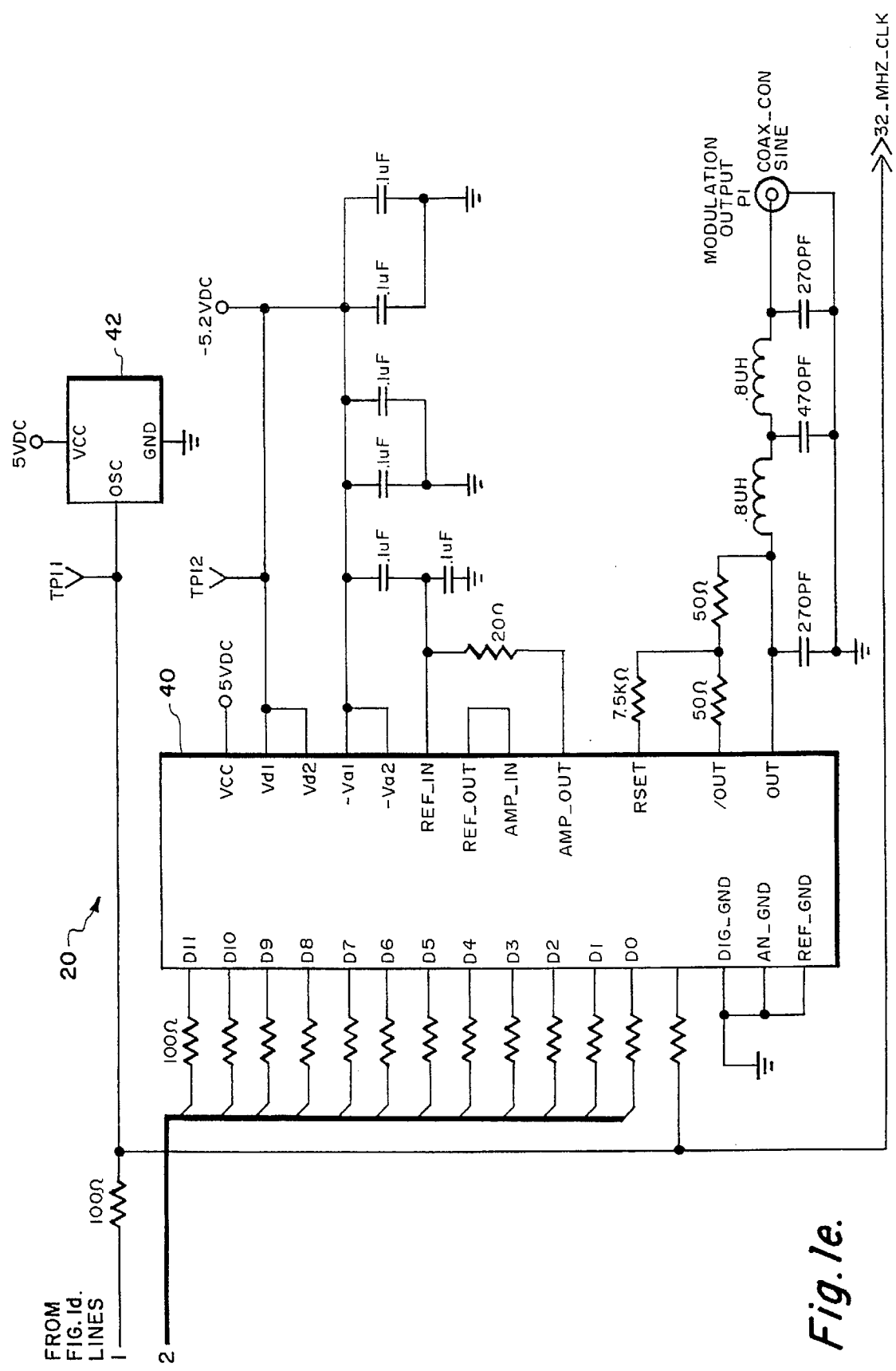
Figure 1F:
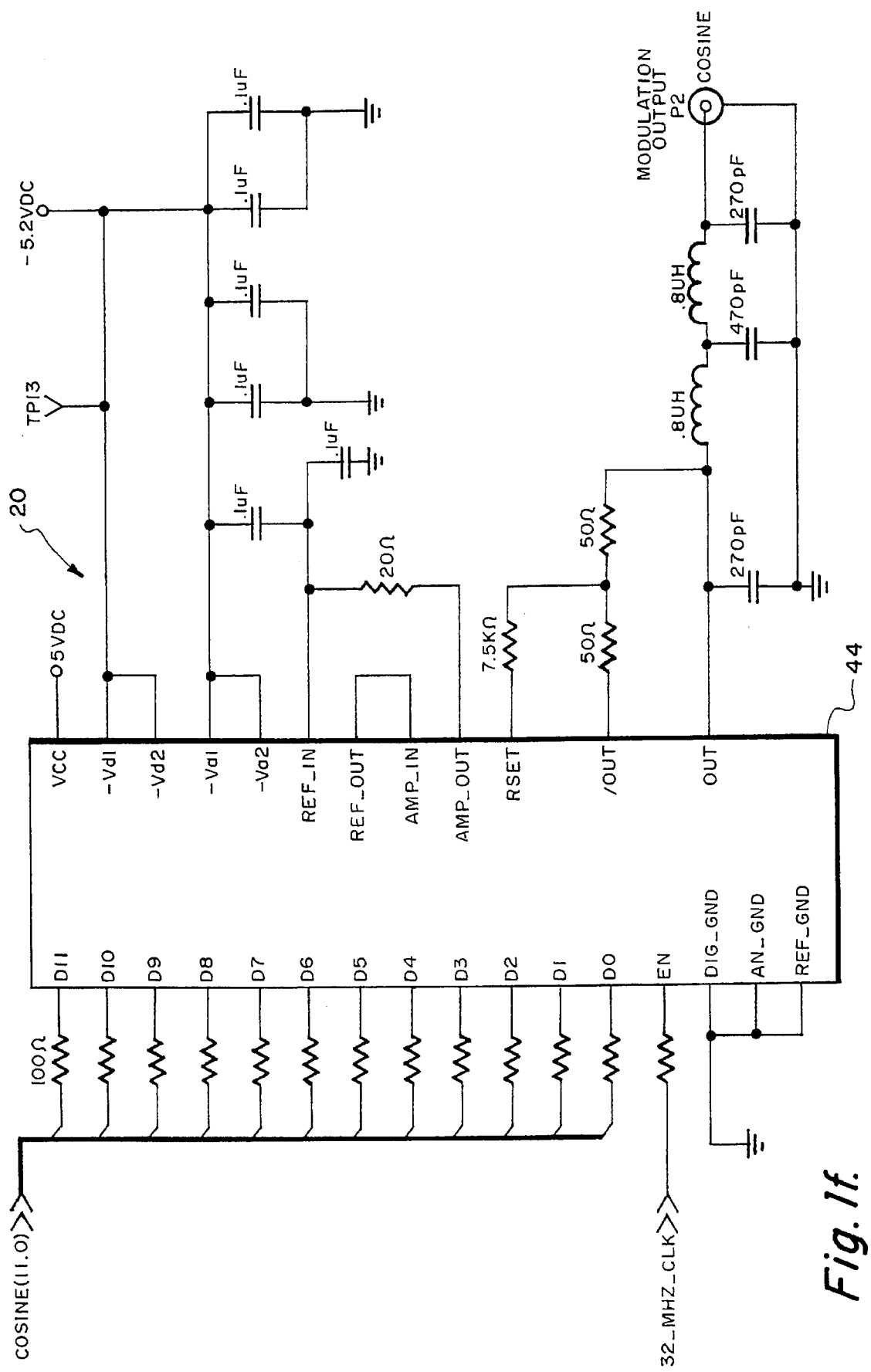

Referring first to FIG. 1a–1f, there is shown a circuit for modulating a sinusoidal waveform signal using digital pulse shaping which is designated generally by the reference numeral 20. Circuit 20 comprises an eight bit microcontroller 22 which provides addressing and the read (RD) and write (WR) control signals for a programmed array logic device 24, as well as supplying a tri-state enable (TR1) signal to the programmed array logic device 24. Each of these control signals are, in turn, active low, that is, for example, programmed array logic device 24 will read the addresses supplied to its A0, A12, A13 and A14 address inputs whenever the read control signal provided by microcontroller 22 to the RD input of programmed array logic device 24 is asserted active low.

Port zero of microcontroller 22 which includes the P00–P07 outputs of microcontroller 22 provides the lower eight bits of addressing (address bits A0–A7) for the logic elements of circuit 20 as well as eight bit data words. The upper eight bits of addressing (address bits A8–A15) for the logic elements of circuit 20 are supplied by port two of microcontroller 22 which includes the P20–P27 outputs of microcontroller 22. Address bits A0–A7 are supplied to the 1D–8D inputs of an eight bit latch 26 and are then latched to the 1Q–8Q outputs of latch 26 by an active low enable control signal supplied by microcontroller 22 to the C input of microcontroller 22.

It should be noted that a logic one supplied to the output control input of latch 26 sets the 1Q–8Q outputs of latch 26 to a high impedance state. This feature of latch 26 is utilized whenever an oscillator data and control circuit 38 controls addressing and data transfer within circuit 20.

The computer software listing of Appendix A is for the software used by microcontroller 22. This software includes the files/modules set forth in the following table.

TABLE I

| ABSACC.H | CTYPE.H | DEBUG.C |
|----------|---------|---------|
| EXTERN.H | FUNDEC.H | INIT.C |
| IOADDR.H | ISR.C | MOD.C |
| MOD.H | NCO.C | REG51.H |
| SERIAL.C | STDIO.H | UTIL.C |

The main program listing for microcontroller 22 is set forth in the program file MOD.C of Appendix A and is entitled MAIN.

At lines 70 through 73 of the MAIN program microcontroller 22 is initialized. The MAIN program jumps to the 8031 INITIALIZATION MODULE (INIT.C). The subroutine INIT INTERVAL TIMER of the file INIT.C sets a timer 0 within microcontroller 22 to an eight bit auto reload mode and a timer 1 to provide a baud rate of 9600 for the serial port of microcontroller 22 which includes the serial input line RXD and the serial output line TXD. These serial lines may be used to interface microcontroller 22 with an external computer, not shown.

It should be noted that an oscillator 28 is included in circuit 20 to provide a clock signal having a frequency of 11.059 Mhz to microcontroller 22.

The INIT.C file also includes the INIT SERIAL PORT subroutine which initalizes the serial port lines RXD and TXD of microcontroller 22. A serial port interrupt and serial port reception are enabled during the INIT SERIAL PORT subroutine of the INIT.C file. The INIT 87C51 subroutine of the INIT.C file sets each port P0, P1, P2 and P3 of microcontroller 22 to an initial value of hexadecimal ff and disables all unused interrupts within microcontroller 22.

After microcontroller 22 is initialized the lower frequency is loaded from microcontroller 22 into a pair of 2048-Word by eight bit RAMS 30 and 32 with RAM 30 being identified as RAM_1 in the MOD.C module and RAM 32 being identified as RAM_2 in the MOD.C module. The lower frequency, which is 9.5 Mhz, is loaded or written into RAM 30 with two eight bit data words having all zeros and RAM 32 with an eight bit word having a hexadecimal value of 00 and an eight bit word having a hexadecimal value of 4C. The lower frequency is loaded into microcontroller 32 twice by the MOD.C module of the software of Appendix A.

The offset frequency is next loaded by microcontroller 22 into RAMS 30 and 32. The offset frequency, which is 1 Mhz, is loaded or written into RAM 30 with two eight bit data words having all zeros and RAM 32 with an eight bit word having a hexadecimal value of 00 and an eight bit word having a hexadecimal value 80.

When circuit 20 is operating in an Frequency Shift Keying mode, the frequency is centered around 10 Mhz and the frequency of the sinusoidal output waveform provided by an oscillator 32 shifts from 9.5 megahertz to 10.5 megahertz or from 10.5 megahertz to 9.5 megahertz when there is a change in logic state of the digital signal provided to a sixteen bit numerically controlled oscillator 36.

After the lower frequency and offset frequency are written into RAMS 30 and 32, the MAIN program enters a DIS RAM subroutine which disables microcontroller 22 from RAMS 30 and 32. Microcontroller 22 provides a logic one to the O_CTRL input of eight bit latch 26 which sets latch 26 in a tri-state mode. An octal buffer 34 is also set in a tri-state mode by microcontroller 22 when microcontroller 22 provides a logic one to the 1G input of buffer 34 and a logic zero to the 2G input of buffer 34.

In a like manner, prior to the lower frequency and the offset frequency being written into RAMS 30 and 32, the MAIN program enters a ENA RAM subroutine. During this subroutine latch 26 is enabled when microprocessor provides a logic zero to the O_CTRL input of latch 26, while buffer 34 is enabled when microcontroller 22 provides a logic zero to the 1G input of buffer 34 and a logic one to the 2G input of buffer 34. Enabling buffer 34 allows data from port P0 of microcontroller 22 to be written into RAM 32 via buffer 34.

Microcontroller 22 also provides a manual load signal which is supplied to an oscillator data and control circuit 38. When the MAN_LOAD line transitions to the logic one state, oscillator data and control circuit 38 reads the lower frequency and the offset frequency data from RAMS 30 and 32 and then writes the data to oscillator 36. Oscillator data and control circuit 38 twice reads sixteen bits from RAMS 30 and 32 via respectively the lines DATA_A(7:0) and DATA(7:0) since the lower frequency and the offset frequency each comprises 32 data bits.

After the logic one manual load signal is provided to oscillator data and control circuit 38, microcontroller 22 supplies an active low sinewave output enable signal to oscillator 36. This sinewave output enable signal enables the SIN0–SIN15 outputs of oscillator 36. The SIN0–SIN15 outputs of oscillator 36 when enabled provide the twelve most significant bits of the digitized sinewave signal to digital to analog converter 40.

The user of the present invention is allowed to change the lower frequency and the offset frequency by utilizing the file DEBUG.C which is entitled DEBUG MODULE. The software of Appendix A enters the DEBUG MODULE when a "DEBUG>" prompt appears on a video screen connected to the external computer. For example, when the user enters the letter "Q" via a keyboard connected to the external computer, the computer will provide the ASCII character for "Q" via the serial input line RXD to microcontroller 22 causing microcontroller 22 to quit the DEBUG module.

The DEBUG module also allows the user of the present invention to, for example, enable octal buffer 34 by typing the letter "B" on the keyboard coupled to the external computer or tri-state the octal buffer 34 by typing the letter "A". When the letter "B" is type on the keyboard, the DEBUG module enters the subroutine SETG1G2. Microcontroller 22 then provides a logic zero to the 1G input of buffer 34 and a logic one to the 2G input of buffer 34, enabling buffer 34. In a like manner, when the letter "A" is type on the keyboard, the DEBUG module enters the subroutine RESETG1G2. Microcontroller 22 then provides a logic one to the 1G input of buffer 34 and a logic zero to the 2G input of buffer 34, which sets the 1Y1–2Y4 outputs of buffer 34 to a tri-state mode.

By typing the letter "D", the user can toggle the enable function for a digital to analog converter 40, that is the user can turn the output of converter 40 on or off. In a like manner, the "R" when entered into the keyboard allows the user to test RAM memory of RAMS 30 and 32. During the subroutine XRAM TEST microcontroller 22 writes zero, hexadecimal ff, hexadecimal aa and hexadecimal 55 into RAMS 30 and 32. Microcontroller 22 then reads these hexadecimal numbers from RAMS 30 and 32 and a comparison of each written hexadecimal number with each read hexadecimal number is made to check the reliability of RAMS 30 and 32. Each of the logic elements of circuit 20 can be tested using the DEBUG module of Appendix A.

The lower frequency for the sinewave signal output by oscillator 36 may set from zero hertz to sixteen megahertz which is one half of the frequency of the thirty two megahertz oscillator clock signal supplied by an oscillator 42 to oscillator 36.

The hexadecimal numbers 4C000000 and 08000000 which respectively represent the center and offset frequencies are determined by the following expression.

$$F = \frac{N \times FCLK}{2^{32}}$$

where F is the quadrature output frequency, N is the output of a frequency adder within oscillator 36 and FCLK is the 32 Mhz oscillator clock signal.

The computer program listing for programmed array logic device 24 is set forth in Appendix B and identified as the MOD.PLD module. Lines 17 through 24 of the MOD.PLD module define the inputs for programmed array logic device 24, while lines 27 through 30 of the MOD.PLD module define the outputs for programmed array logic device 24.

The logic equation for providing a chip select signal to RAM 30 is set forth at line 34 of the MOD.PLD module. The logic equation for providing a chip select signal to RAM 32 is set forth at line 35 of the MOD.PLD module. The logic equation for providing an output enable signal to RAMS 30 and 32 is set forth at line 36 of the MOD.PLD module. In each of these logic equations an explanation point "!" indicates that the function is not.

When, for example, a logic zero is provided to the/WR input of programmed array logic device 24, a logic zero is provided to the A11 input of device 24 and a logic zero is provided to the A12 input of device 24, programmed array logic device 24 decode these logic signals and then provides a chip select RAM one (CS_RAM1) enable signal which is an active low signal enabling RAM 30 allowing data to be written into RAM 30 or read from RAM 30.

When a logic one is provided to the RD input, programmed array logic device 24 decodes this signal and then provides a logic zero RAM output enable (OE_RAM) signal to the/OE inputs of RAMS 30 and 32. Depending upon which chip select signal is asserted, RAM_CS1 for RAM30 or RAM_CS2 for RAM 32, data is read from either RAM 30 or RAM 32. It should be noted that the/WE inputs to RAMS 30 and 32 must be at the logic one state for data to be read from RAMS 30 and 32.

For the write operation to either RAM 30 or RAM 32 the /CS input to the selected RAM 30 or 32 must be at the logic zero state, the/OE input must be at the logic zero state and the/WE input must be at the logic zero state.

It should also be noted that programmed array logic device 24 generates a chip select signal for the oscillator data and control circuit 38 (line 32 of Appendix A). This chip select signal is supplied through the EPM_CS input of oscillator data and control circuit 38 to the CS of mode control and count register 44 enabling register 44.

At lines 39–41 of the MOD.PLD module of Appendix B, the RAM_CS1, RAM_CS2 and RAM_OE outputs of microcontroller 24 are set in a tri-state mode. This occurs whenever these outputs are not asserted by programmable array logic device 24. At line 32 the output EMP_CS of programmable array logic device 24 is enabled.

It should be noted that whenever the RAM_CS1, RAM_CS2 and RAM_OE outputs of microcontroller 24 are set in a tristate mode, oscillator data and control circuit 38 controls the read and write functions of RAMS 30 and 32.

At this time it should be noted that the microcontroller 22 used in the preferred embodiment of the present invention is a Model 87C51 CMOS Single-Chip 8-Bit Microcontroller manufactured by Intel Corporation of Santa Clara, Calif.; the programmed array logic device 24 is a Model GAL20V8 High Performance $E^2$-CMOS PLD manufactured by Lattice Semiconductor Corporation of Hillsboro, Oreg. and the RAMS 30 and 32 are Model IDT6116SA CMOS Static Rams (16Kx8-BIT) manufactured by Integrated Devices Technology Inc. of Santa Clara, Calif. Further, eight bit latch 26 is a Model SN54HC573 Octal D-Type Latch available from Texas Instruments of Dallas, Tex. and octal buffer 34 is a Model SN54HC241 Octal Buffer also available from Texas Instruments.

Figure 2A:
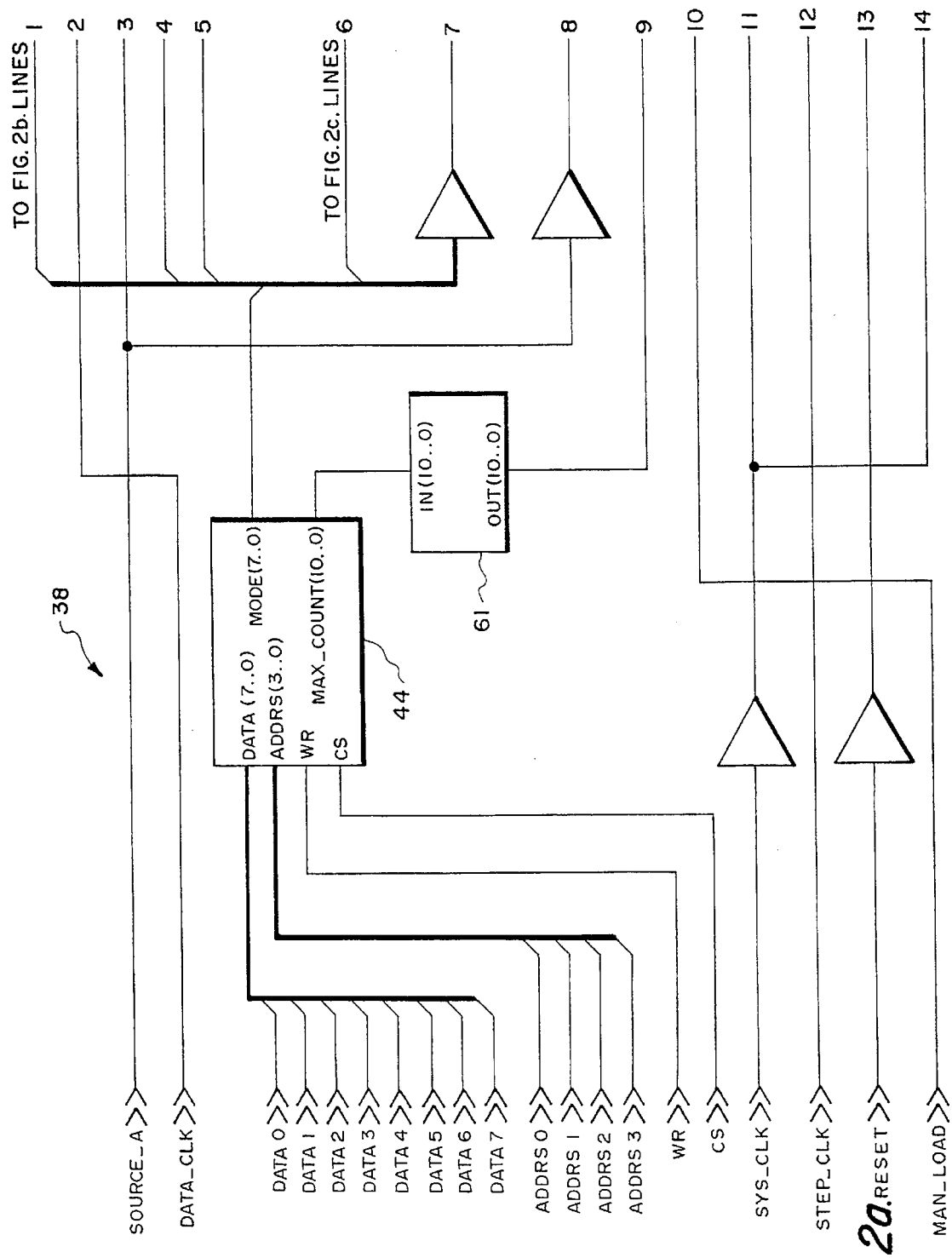
FIGS. 2a–2c are a detailed electrical schematic diagram oscillator data and control circuit of FIG. 1.
Figure 2B:
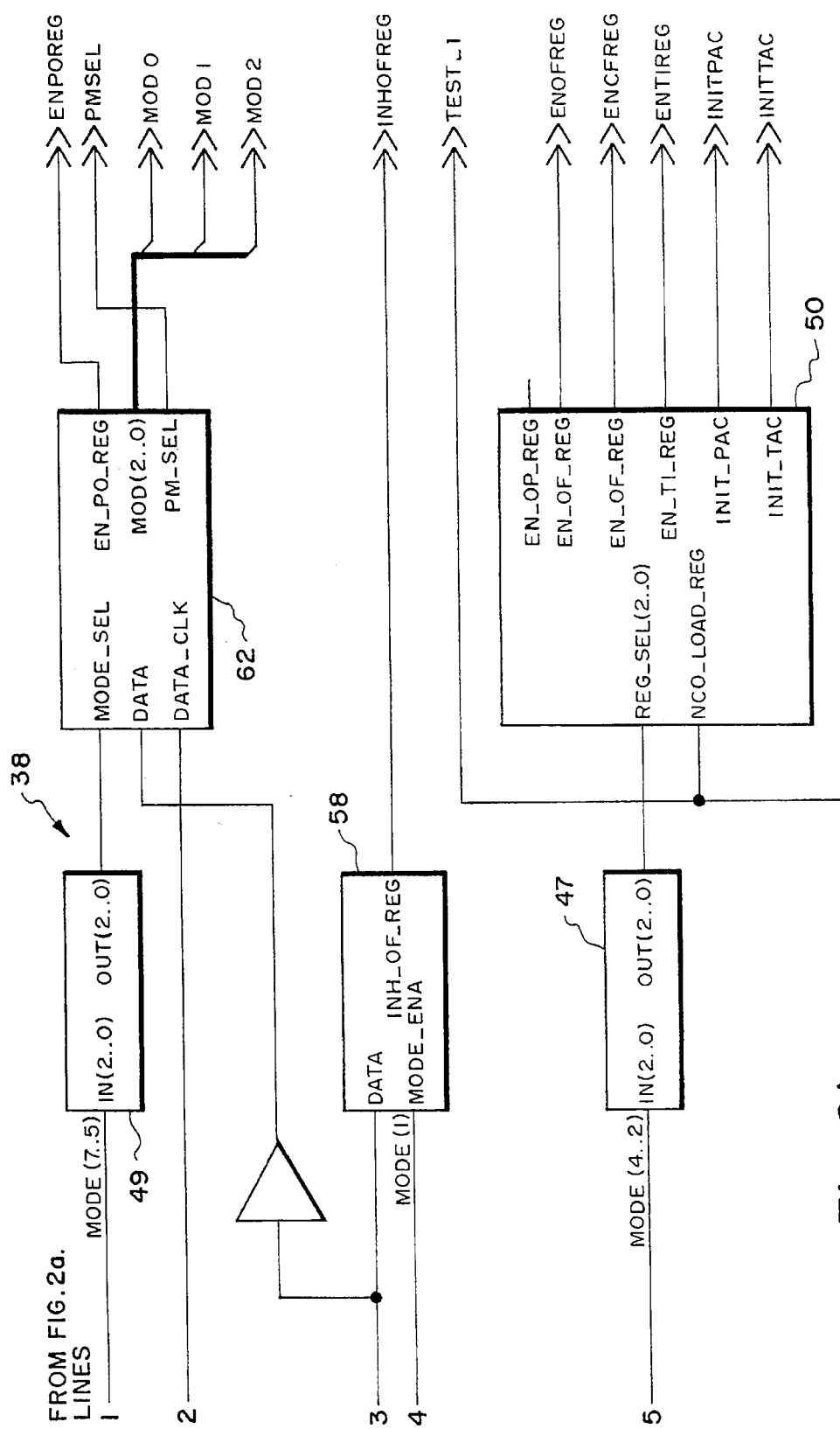
Figure 2C:
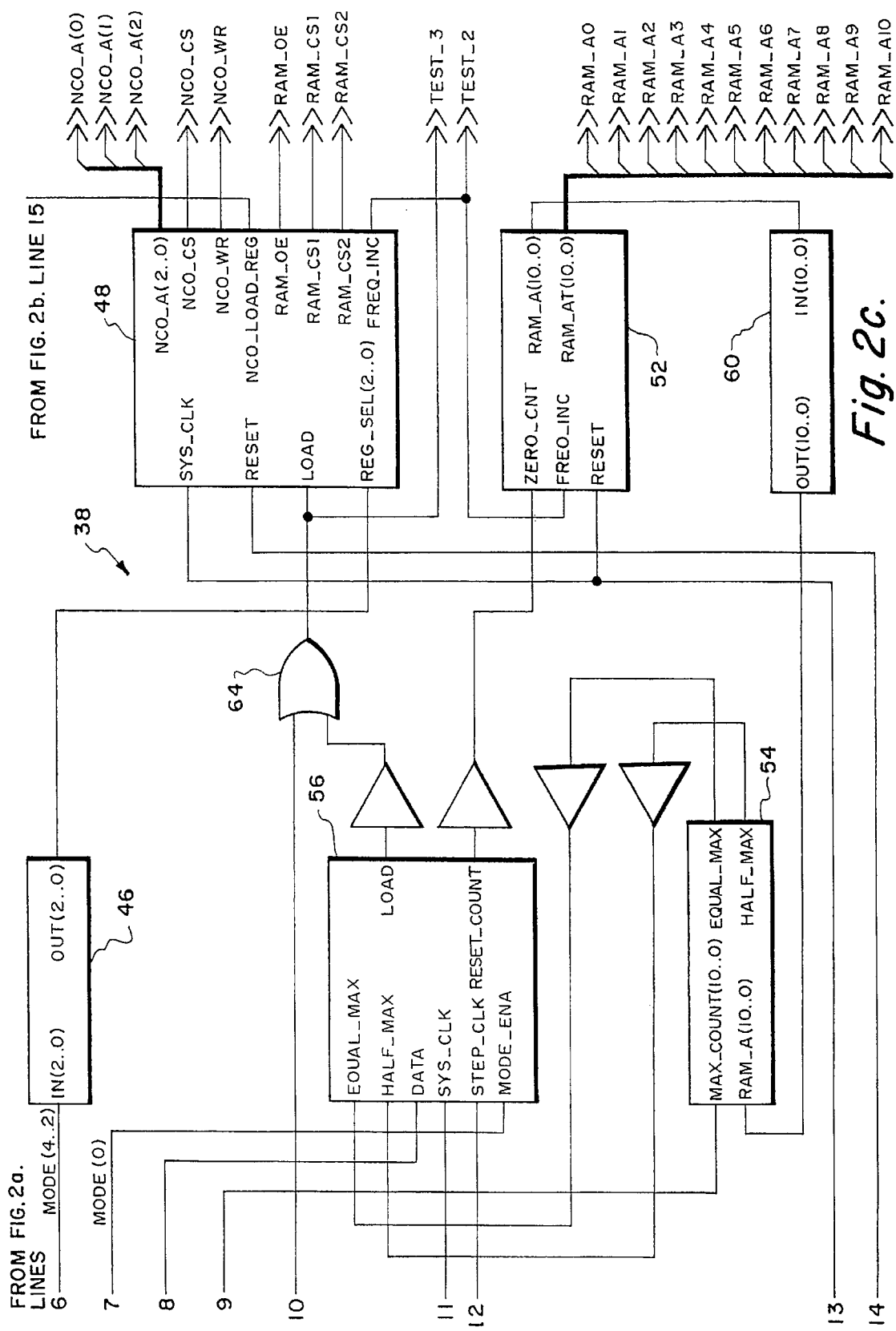

Referring to FIGS. 1a–1f and 2a–2c at lines 92 and 119 of the MAIN program (MOD.C module), microcontroller 22 transfers to oscillator data and control circuit 38 the hexadecimal number 0C, 08 and 02 via the DATA(7:0) lines. The hexadecimal numbers 0C, 08 and 02 are then supplied to the DATA[7..0] inputs of mode control and count register 44. The hexadecimal numbers 0C, 08 and 02 when processed by mode control and count register 44 set up the mode of operation of sixteen bit numerically controlled oscillator 36.

At this time it should be noted that the numerical controlled oscillator used in the preferred embodiment of the present invention is a Model HSP45106 16-Bit Numerically Controlled Oscillator manufactured by Harris Semiconductor of Melbourne, Fla. While the oscillator 36 may be set up to produce an FM, PSK, FSK or MSK modulated waveform, the following discussion is with respect to the FSK mode of operation of oscillator 36.

Microcontroller 22 also supplies addresses XBYTE [EPM], XBYTE[EPM+1] and XBYTE[EPM+2] to the ADDRS[3..0] inputs of mode control and count register 44 via the ADDR(15:0) lines. Logic zero write and chip select signals are also supplied to the mode control and count register 44 from microcontroller 22 to effect the transfer of the hexadecimal numbers 0C, 08 and 02 from microcontroller 22 to register 44 of circuit 38.

Mode control and count register 44 includes three registers with each register having a separate address which is defined at lines 49-55 of the REG CONTROLLER file of Appendix C. For example when the address is zero the register D0 is being written into or accessed. In a like manner, when the address is two (0010) the register D1 is being accessed and when the address is three (0011) the register D2 is being accessed. The register D0 is the mode register and the registers D1 and D2 are the maximum count registers of mode control and count register 44. The maximum count registers D1 and D2 within register 44 are used in a slew mode of operation.

The outputs of register D0 are the MODE[7..0] outputs of mode control and count register 44, while the outputs of registers D1 and D2 are the MAX_COUNT [10..0] outputs of mode control and count register 44. Register D1 is the lower eight bits of the eleven bit word, while register D2 is the upper three bits of the eleven bit word. The MAX COUNT [10..0] outputs of mode count and count register 44 are connected to the MAX_COUNT [10..0] inputs of a RAM address comparator circuit 54.

When the present invention is operating in the FSK mode maximum count registers D1 and D2 within register 44 have hexadecimal ff written therein, that is eight logic ones are written into registers D1 and D2 within register 44.

Mode control and count register 44 controls the modes of operation of oscillator 36 in accordance with the following table.

TABLE II

| Data Bit | Mode |
| --- | --- |
| D7 | P2 |
| D6 | P1 |
| D5 | P0 |
| D4 | M2 |
| D3 | M1 |
| D2 | M0 |
| D1 | F0 |
| D0 | S0 |

An eight bit (Bits D7–D0) mode control word is supplied to the mode control register 44 by microcontroller 22. The eight bit mode control words for the FSK mode of operation of oscillator 36 are the hexadecimal numbers 0C, 08 and 02.

Bits D7–D5 control the phase shift key (PSK) mode of operation of oscillator 36; bits D4–D2 control the DMA modes of operation of oscillator 36; bit D1 controls the BFSK mode and bit D0 controls the slew mode.

Microcontroller 22 first supplies the hexadecimal number 0C to the mode control and count register 44 (line 92 of the MAIN program of Appendix A). The hexadecimal number 0C has a binary value of 0,0,0,0,1,1,0,0 which in accordance with the following table is the DMA Mode Enable Center Frequency Register.

TABLE III

| M2,M1,M0 | | | Function | Load Value |
| --- | --- | --- | --- | --- |
| 0 | 0 | 0 | Disabled | 00 h |
| 0 | 0 | 1 | N/A | |
| 0 | 1 | 0 | Enable Offset Frequency Register | 08 h |
| 0 | 1 | 1 | Enable Center Frequency Register | 0 Ch |
| 1 | 0 | 0 | Enable Timer Increment Register | 10 h |
| 1 | 0 | 1 | Enable Initialize Phase Accumulator Register | 14 h |
| 1 | 1 | 0 | Enable Initialize Timer Register | 18 h |
| 1 | 1 | 1 | N/A | |

Microcontroller 22 next supplies the hexadecimal number 08 to the mode control and count register 44 (line 119 of the MAIN program of Appendix A). Hexadecimal 08, which is binary 0,0,0,0,1,0,0,0, is the DMA Mode Enable Offset Frequency Register as set forth in Table III.

The three control bits M2, M1 and M0 are supplied from mode control and count register 44 through a three input MCELL buffer 46 to the REG_SEL[2..0] inputs of Numerical Controlled Oscillator DMA Controller circuit 48.

Microcontroller 22 also supplies the hexadecimal number 02 to the mode control and count register 44 (line 119 of the MAIN program of Appendix A). The hexadecimal number 02 has a binary value of 0,0,0,0,0,0,1,0 which in accordance with the following table is the BFSK (Binary Frequency shift key) mode of operation.

TABLE IV

| F0 | Function | Load Value |
| --- | --- | --- |
| 0 | Disabled | 00 h |
| 1 | BFSK | 02 h |

At this time it should be noted that oscillator data and control circuit 38 is a Model EPM5128A EPLD (Erasable Programmable Logic Device) manufactured by Altera Corporation of San Jose, Calif. The EPM5128A EPLD uses an Altera Development Program the files set forth in Appendix C and the following table to provide the logic functions shown in FIGS. 2a–2c.

TABLE V

| Logic Element (FIGS. 2a–2c) | File (Appendix C) |
| --- | --- |
| mode control and count register 44 | REG CONTROLLER |
| MCELL buffers 46, 47 and 49 | MCELL3 BUFFER |
| DMA controller circuit 48 | NCO DMA CONTROLLER |
| register controller circuit 50 | NCO REGISTER CONTROLLER |
| RAM address controller 52 | RAM ADDRESS CONTROLLER |
| RAM address comparator 54 | RAM ADDRESS COMPARATOR |
| slew controller circuit 56 | SLEW CONTROLLER |
| BFSK controller circuit 58 | BFSK CONTROLLER |
| MCELL buffers 60 and 61 | MCELL10 BUFFER |
| PSK controller circuit 62 | PSK CONTROLLER |

Microcontroller 22 also supplies a pair of logic one manual load pulses to the MAN_LOAD input of oscillator data and control circuit 38. The manual load pulse then passes through an OR gate 64 to the LOAD input of DMA controller circuit 48. The first manual load pulse from microcontroller 22 (lines 102 and 103 of the MAIN program of Appendix A) effects a transfer of the thirty two bits representing the lower frequency of 9.5 Mhz. The second manual load pulse from microprocessor 22 (lines 129 and 130 of the MAIN program of Appendix A) effects a transfer of the thirty two bits representing the offset frequency of 1.0 Mhz.

Numerical Controlled Oscillator DMA Controller circuit 48, in response to the first and second manual load pulses and the control bits M1, M2 and M3, generate address bits A2, A1 and A0 and chip select and write enable signals to load the least and most significant bits of the lower frequency into LSB and MSB lower frequency input registers within oscillator 36 as well as the least and most significant bits of the offset frequency into LSB and MSB offset frequency input registers within oscillator 36.

The following table illustrates the addressing requirements for loading the LSB and MSB center frequency input registers and the LSB and MSB offset frequency input registers within oscillator 36.

TABLE VI

| A2,A1,A0 | | | Function |
|---|---|---|---|
| 0 | 0 | 0 | Load least significant bits of Center Frequency Input |
| 0 | 0 | 1 | Load most significant bits of Center Frequency Input |
| 0 | 1 | 0 | Load least significant bits of Offset Frequency Input |
| 0 | 1 | 1 | Load most significant bits of Offset Frequency Input |

When at the logic zero state the chip select signal enables the data from RAMs 30 and 32 to be written into numerically controlled oscillator 36. The write enable signal is an active low. Data from RAMS 30 and 32 is clocked into the register within oscillator 36 selected by the address bits A2, A1 and A0 on the rising edge of the write enable signal when the chip select signal is a logic zero.

At this time it should be noted that Numerical Controlled Oscillator DMA Controller circuit 48 is a state machine having states S0 through S7. The functions processed by DMA Controller circuit 48 during each state are set forth in the file NCO DMA CONTROLLER of Appendix C.

As is best illustrated by the timing waveforms of FIG. 3, during state S0 (FIG. 3N) the state machine of DMA Controller circuit 48 enters a power up mode. The RESET input (FIG. 3B) to oscillator data and control circuit 38 is initially active low, while the RAM_OE line (FIG. 3H), the RAM-CS1 line (FIG. 3F) and the RAM_CS2 line (FIG. 3G) are each in a tri-state mode since microcontroller 22 is controlling these lines.

When the RESET input of oscillator data and control circuit 38 (FIG. 3B) transitions to the logic one state then the RAM_OE output (FIG. 3H), the RAM-CS1 output (FIG. 3F) and the RAM_CS2 output (FIG. 3G) of DMA Controller circuit 48 each transition to the logic one state which results in oscillator data and control circuit 38 having control of read operations from RAMS 30 and 32. During State S0 the NCO_CS output (FIG. 3I), the NCO_WR output (FIG. 3J) the NCO_LOAD_REG output (FIG. 3K) and the FREQ_INC of DMA Controller circuit 48 are each inactive. In addition during state S0, the address lines NCO_A(0) –NCO_A(2) of circuit 48 are each zero (FIG. 3M). The REG_SEL (2..0) inputs (FIG. 3E) which receive bits D4, D3 and D2 of the mode control word is two through each state S0–S7.

When microcontroller 22 asserts the manual load signal causing the LOAD input of DMA Controller circuit 48 to transition to the logic one state (FIG. 3C), an internal RUN signal within DMA Controller circuit 48 transitions to the logic one state (FIG. 3D). The RUN signal of FIG. 3D enables the state machine within DMA Controller circuit 48.

An oscillator 37 supplies a 20 Mhz system clock signal (FIG. 3A) to the SYS_CLK input of oscillator data and control circuit 38 After the RUN signal of FIG. 3D transitions to the logic one state, the first clock pulse 70 of the 20 Mhz system clock signal of FIG. 3A the state machine proceeds to state S1. The second clock pulse 72 causes the state machine to proceed to state S2. When the state machine enters state S2, the RAM_OE output (FIG. 3H), the RAM-CS1 output (FIG. 3F), the RAM_CS2 output (FIG. 3G), the NCO_CS output (FIG. 3I) and the NCO_WR output (FIG. 3J) are each asserted, that is each output transitions to the logic state. This, in turn, effects a read operation from RAMS 30 and 32 putting an eight bit data word from RAM 30 on the DATA_A(7:0) lines and an eight bit data word from RAM 32 on the DATA(7:0) lines.

The next clock pulse 74 of the 20 Mhz system clock signal of FIG. 3A causes the state machine to transition to state S3. When the state machine of DMA controller circuit 48 transitions state S3 the numerically controlled oscillator write signal (NCO_WR) of FIG. 3J will transition from a logic zero to a logic one. This transition of clock pulse 74 effects a write of the eight bit data word the DATA_A(7:0) lines and the eight bit data word on the DATA(7:0) lines into numerically controlled oscillator 36. In a like manner, a logic zero to one transition of the clock pulse 80 (FIG. 3A) effects a write of second sixteen bit data word from RAMS 30 and 32 into numerically controlled oscillator 36. The first 32 bit data word written into numerically controlled oscillator 36 from RAMS 30 and 32 by the state machine of DMA controller 48 is the hexadecimal number 4C000000 which is the 9.5 Mhz lower frequency.

It should be noted that the waveforms of FIG. 3 illustrate the loading of the offset frequency into oscillator 36 since the numerical value of FIG. 3E is two. The timing waveforms of FIG. 3 will be identical for loading the lower frequency except that the numerical value of FIG. 3E is three.

When microcontroller 22 again supplies a logic one to the MAN_LOAD input of oscillator data and control circuit 38 (line 129 of the MAIN program) the state machine of DMA Controller circuit 48 will effect a write of the 32 bit data word for the offset frequency into numerically controlled oscillator 36.

During state S4 the frequency increment pulse of FIG. 3L is provided by DMA Controller circuit 48 to the FREQ_INC input of RAM address controller 52 which increments RAM address controller 52 thereby providing a new address to RAM 30 and 32 which allows the read of the second of the sixteen bit data words from RAMS 30 and 32 during state S5 and the subsequent write of the second of the sixteen bit data words into oscillator 36 at the leading edge of the clock pulse 80 of FIG. 3A.

At this time it should be noted that the load center frequency and load offset frequency portions of the MAIN program each include an ENA RAM subroutine which allows the oscillator data and control circuit 38 to be reset by supplying a logic zero to the RESET input of circuit 38. This logic zero, in turn, resets the state machine of Numerical Controlled Oscillator DMA Controller circuit 48 to state S0 (FIG. 3N).

Oscillator data and control circuit 38 also includes a register controller circuit 50 which supplies control signals ENOFREG and ENCFREG to numerically controlled oscillator 36. The ENOFREG signal is an active low signal. When the ENOFREG signal is active after being clocked into oscillator 36 by the 32 Mhz oscillator clock signal, the ENOFREG signal enables the clocking of data into the Offset Frequency Register within Oscillator 36. After the Offset Frequency Register is enabled a second clock pulse of the 32 Mhz oscillator clock signal is required to load the Offset Frequency Register within oscillator 36.

The ENCFREG signal is also an active low signal. When the ENCFREG signal is active after being clocked into oscillator 36 by the 32 Mhz oscillator clock signal, the ENCFREG signal enables the clocking of data into the Center Frequency Register within Oscillator 36. After the Center Frequency Register is enabled a second clock pulse of the 32 Mhz oscillator clock signal is required to load the Center Frequency Register within oscillator 36.

It should also be noted that prior to a manual load the MAIN program of Appendix A at lines 99 and 126 enters the DIS RAM subroutine which disables microcontroller 22 from RAMS 30 and 32 allowing oscillator data and control circuit 38 to effect data transfers from RAMS 30 and 32 to sixteen bit numerically controlled oscillator 36.

Oscillator data and control circuit 38 includes a binary frequency shift key (BFSK) controller circuit 58 which when enabled allows serial binary data stream from an external source, not shown, to first pass through the source A input of circuit 38 and then pass through BFSK controller circuit 58 of circuit 38 to the /INHOFR input of sixteen bit numerically controlled oscillator 36. When control bit D1 is a logic one, mode control and count register 44 supplies a logic to the MODE_ENA input of BFSK controller circuit 58 enabling BFSK controller circuit 58.

The serial binary data stream passes through a control register within oscillator 36 to the control input of a multiplexer within oscillator 36. Depending upon the value of a bit the multiplexer will allow the 1 Mhz offset frequency to pass therethrough and be added to the lower frequency of 9.5 MHz by an adder within oscillator 38 or inhibit the 1 Mhz offset frequency from passing through the multiplexer within oscillator 38. When, for example, a bit within the serial binary data stream is a logic one, the 1 Mhz offset frequency is added to the 9.5 Mhz lower frequency resulting in a 16 bit 10.5 Mhz digitized sinewave at the SIN0–SIN15 outputs of oscillator 36. When, however, a bit within the serial binary data stream is a logic zero, the 1 Mhz offset frequency is inhibited from passing through the multiplexer within oscillator 36 which results in a 16 bit 9.5 Mhz digitized sinewave at the SIN0–SIN15 outputs of oscillator 36. The twelve most significant bits of the digitized sinewave signal are then supplied to the D0–D11 inputs of digital to analog converter 40. Digital to analog converter 40 converts the digitized signal to an analog sinewave signal having a frequency of 10.5 Mhz whenever a bit within the serial binary data stream is one and 9.5 Mhz whenever a bit within the serial binary data stream is zero.

At this time it should be noted that the digital to analog converters 40 and 44 used in the present invention are Model Q2520 D/A converters manufactured by Qualcomm Incorporated of San Diego, California.

From the foregoing, it may readily be seen that the present invention comprises a new, unique and exceedingly useful electronics circuit which may be used to frequency shift keying a continuous-running carrier, such as a sinewave. Obviously, many modifications and variations of the present invention are possible in light of the above teachings. It is therefore to be understood that within the scope of the appended claims the invention may be practiced otherwise than as specifically described.

Navy Case No. 76,558

Appendix A

```
1    /* (c) Copyright FRANKLIN SOFTWARE, INC.  1989, 1990 All rights reserved. */
2    /* ABSACC.H: direct access to 8051 memory areas, ver. 1.0 */
3
4    #define CBYTE ((unsigned char *) 0x50000L)
5    #define DBYTE ((unsigned char *) 0x40000L)
6    #define PBYTE ((unsigned char *) 0x30000L)
7    #define XBYTE ((unsigned char *) 0x20000L)
8
9    #define CWORD ((unsigned int *) 0x50000L)
10   #define DWORD ((unsigned int *) 0x40000L)
11   #define PWORD ((unsigned int *) 0x30000L)
12   #define XWORD ((unsigned int *) 0x20000L)
```

Navy Case No. 76,558

```
1    /* (c) Copyright FRANKLIN SOFTWARE, INC.  1989, 1990 All rights reserved. */
2    /* CTYPE.H: prototypes for character functions, ver 1.0 */
3
4    extern bit isalpha (char);
5    extern bit isalnum (char);
6    extern bit iscntrl (char);
7    extern bit isdigit (char);
8    extern bit isgraph (char);
9    extern bit isprint (char);
10   extern bit ispunct (char);
11   extern bit islower (char);
12   extern bit isupper (char);
13   extern bit isspace (char);
14   extern bit isxdigit (char);
15   extern char tolower (char);
16   extern char toupper (char);
17   extern char toint   (char);
18
19   #define _tolower(c) ( (c)-'A'+'a' )
20   #define _toupper(c) ( (c)-'a'+'A' )
21   #define _toascii(c) ( (c) & 0x7F )
```

Navy Case No. 76,558

```
1    /***********************************************
2    *              DEBUG MODULE                    *
3    ***********************************************/
4    /* filename: debug.c */
5
6    #include "mod.h"
7    #include "extern.h"
8    #include "funcdec.h"
9
10   #define MAKE_ROOM 0
11
12   void set_bpsk(void);
13
14
15   /***********************************************
16   *              DEBUG MODULE                    *
17   ***********************************************/
18   void debug(void)
19   {
20   byte ch,value;
21   word addrs;
22
23       show_version();
24
25       /* debug loop */
26       while(1){
27           printf("DEBUG> ");    /* display prompt */
28
29           while(RXtail == RXhead);      /* wait for user input */
30
31           /* decode command and execute */
32           ch = getq();
33           switch(toupper(ch)){
34               case 'M':           /* toggle manual load */
35                   toggle_man_load();
36                   break;
37               case 'R':           /* RAM memory test */
38                   xram_test();
39                   break;
40               case 'Q':           /* quit debug */
41                   printf("\n\rQuit debug");
42                   return;
43               case 'A':           /* reset G1 G2 */
44                   reset_g1g2();
45                   break;
46               case 'B':           /* set G1 G2 */
47                   set_g1g2();
48                   break;
49               case 'C':           /* toggle reset */
50                   toggle_reset();
51                   break;
52               case 'D':           /* toggle DAC enable */
53                   toggle_dac_ena();
54                   break;
55               case 'E':           /* toggle tri state */
56                   toggle_tri_state();
57                   break;
```

Navy Case No. 76,558

```
 58                case 'F':            /* load new center freqency */
 59                    set_cent_freq();
 60                    break;
 61                case 'G':            /* reset address ports */
 62                    reset_addrs();
 63                    break;
 64                case 'H':            /* load new offset freqency */
 65                    set_offset_freq();
 66                    break;
 67                case 'J':            /* set mode to BPSK */
 68                    set_bpsk();
 69                    break;
 70                case '?':            /* list commands */
 71                    help();
 72                    break;
 73                case 'V':
 74                    show_version();
 75                    break;
 76                case 'O':            /* output external memory */
 77                    /* enable 87C51 to write to RAM */
 78                    ena_ram();
 79                    printf(" enter: <address> <value> ");
 80                    scanf("%4x %b2x",&addrs,&value);
 81                    printf("\n\r Out put: %04x = %b02x",addrs,value);
 82                    XBYTE[addrs] = value;
 83                    /* disable 87C51 from RAM */
 84                    dis_ram();
 85                    break;
 86                case 'I':            /* input from external memory */
 87                    /* enable 87C51 to write to RAM */
 88                    ena_ram();
 89                    printf(" enter: <address> ");
 90                    scanf("%4x",&addrs);
 91                    value = XBYTE[addrs];
 92                    printf("\n\r %04x = %b02x",addrs,value);
 93                    /* disable 87C51 from RAM */
 94                    dis_ram();
 95                    break;
 96                case '\r':
 97                    break;
 98                default:              /* unknown character */
 99                    printf(" %c ?",ch);
100            }
101            printf("\n\r");
102        }
103    }
104
105    /***********************************************
106    *              SHOW VERSION                    *
107    ***********************************************/
108    void show_version(void)
109    {
110    #if MAKE_ROOM
111        printf("\n\r SIDS Digital Modulator Controller \n\r");
112        printf(" Version %s \n\r",VERSION);
113        printf(" Copyright (c) Anthony Cirineo \n\r");
114        printf(" %s,  %s \n\r",__TIME__,__DATE__);
```

Navy Case No. 76,558

```
115     #endif
116     }
117
118     /***********************************************
119     *              XRAM TEST                       *
120     ***********************************************/
121     void xram_test(void)
122     {
123     #if MAKE_ROOM
124     word k;
125
126         /* enable 87C51 to write to RAM */
127     /*    ena_ram();  */
128
129         printf("\n\rRAM memory test\n\r");
130         for(k = 0;k <= 0x07ff;k++){
131             printf("\rchecking %04X",k);
132
133             XBYTE[k] = 0;
134             if(XBYTE[k] != 0x00)
135                 printf("\n\rRAM failed at %04X",k);
136
137             XBYTE[k] = 0xff;
138             if(XBYTE[k] != 0xff)
139                 printf("\n\rRAM failed at %04X",k);
140
141             XBYTE[k] = 0xaa;
142             if(XBYTE[k] != 0xaa)
143                 printf("\n\rRAM failed at %04X",k);
144
145             XBYTE[k] = 0x55;
146             if(XBYTE[k] != 0x55)
147                 printf("\n\rRAM failed at %04X",k);
148         }
149         init_que();
150         printf("\n\rRAM test done");
151
152         /* disable 87C51 from RAM */
153     /*    dis_ram(); */
154     #endif
155     }
156
157     /***********************************************
158     *          TOGGLE DAC ENABLE                   *
159     ***********************************************/
160     void toggle_dac_ena(void)
161     {
162     byte i;
163
164         OES = ~OES;     /* toggle NCO sine output, active low */
165         OEC = 1;        /* disable NCO cosine output, active low */
166         i = OES;
167         printf("\n\rOES = %b1x",i);
168     }
169
170     /***********************************************
171     *          TOGGLE RESET                        *
```

Navy Case No. 76,558

```
172     ***********************************************/
173     void toggle_reset(void)
174     {
175     byte i;
176
177         RESET = ~RESET; /* toggle RESET */
178         i = RESET;
179         printf("\n\rRESET = %blx",i);
180     }
181
182     /***********************************************
183     *           TOGGLE TRI STATE                   *
184     ***********************************************/
185     void toggle_tri_state(void)
186     {
187     byte i;
188
189         TRI_STATE = ~TRI_STATE;  /* toggle TRI STATE */
190         i = TRI_STATE;
191         printf("\n\rTRI STATE = %blx",i);
192     }
193
194     /***********************************************
195     *           RESET ADDRESS PORTS                *
196     ***********************************************/
197     void reset_addrs(void)
198     {
199         printf("\n\rWriting FFh to P0 and P2");
200         P0 = 0xff;      /* port 0 */
201         P2 = 0xff;      /* port 2 */
202     }
203
204     /***********************************************
205     *           SET G1G2                           *
206     ***********************************************/
207     void set_g1g2(void)
208     {
209     byte i,j;
210
211         /* enable 54HC241 buffer */
212         G1 = 0;
213         G2 = 1;
214         i = G1;
215         j = G2;
216
217         printf("\n\rSet G1 = %blx, G2 = %blx",i,j);
218     }
219
220     /***********************************************
221     *           RESET G1G2                         *
222     ***********************************************/
223     void reset_g1g2(void)
224     {
225     byte i,j;
226         /* disable 54HC241 buffer */
227         G1 = 1;
228         G2 = 0;
```

40

Navy Case No. 76,558

```
229        i = G1;
230        j = G2;
231
232        printf("\n\rReset G1 = %b1x, G2 = %b1x",i,j);
233     }
234
235     /************************************************
236      *           TOGGLE MANUAL LOAD                  *
237      ************************************************/
238     void toggle_man_load(void)
239     {
240        MAN_LOAD = 1;
241        MAN_LOAD = 0;
242     }
243
244     /************************************************
245      *           SET CENTER FREQUENCY                *
246      ************************************************/
247     void set_cent_freq(void)
248     {
249     word lower,upper;
250
251        /* enable 87C51 to write to RAM */
252        ena_ram();
253
254        /* get new center frequency */
255        printf(" enter: <center frequency in HEX> <MSW> <LSW>");
256        scanf("%4x %4x",&upper,&lower);
257        printf("\n\rMSW = %04X, LSW = %04X",upper,lower);
258
259        /* load LSB into memory RAM 1*/
260        XBYTE[RAM_1] = lower & 0x00ff;
261        XBYTE[RAM_2] = (lower >> 8) & 0x00ff;
262
263        /* load MSB into memory RAM 2*/
264        XBYTE[RAM_1+1] = upper & 0x00ff;
265        XBYTE[RAM_2+1] = (upper >> 8) & 0x00ff;
266
267        /* select which register to load in ALTERA */
268        XBYTE[EPM] = 0x0c; /* enable center frequency register */
269
270        /* set max count registers in the ALTERA */
271        XBYTE[EPM+1] = 0xff;
272        XBYTE[EPM+2] = 0xff;
273
274        /* disable 87C51 from RAM */
275        dis_ram();
276
277        /* trigger a manual load */
278        MAN_LOAD = 1;
279        MAN_LOAD = 0;
280     }
281
282     /************************************************
283      *           SET OFFSET FREQUENCY                *
284      ************************************************/
285     void set_offset_freq(void)
```

41

Navy Case No. 76,558

```
286     {
287     word lower,upper;
288
289             /* enable 87C51 to write to RAM */
290             ena_ram();
291
292             /* get new center frequency */
293             printf(" enter: <offset frequency in HEX> <MSW> <LSW>");
294             scanf("%4x %4x",&upper,&lower);
295             printf("\n\rMSW = %04X, LSW = %04X",upper,lower);
296
297             /* load LSB into memory RAM 1*/
298             XBYTE[RAM_1] = lower & 0x00ff;
299             XBYTE[RAM_2] = (lower >> 8) & 0x00ff;
300
301             /* load MSB into memory RAM 2*/
302             XBYTE[RAM_1+1] = upper & 0x00ff;
303             XBYTE[RAM_2+1] = (upper >> 8) & 0x00ff;
304
305             /* select which register to load in ALTERA */
306             XBYTE[EPM] = 0x08 | 0x02; /* enable offset frequency register, and FSK */
307
308             /* set max count registers in the ALTERA */
309             XBYTE[EPM+1] = 0xff;
310             XBYTE[EPM+2] = 0xff;
311
312             /* disable 87C51 from RAM */
313             dis_ram();
314
315             /* trigger a manual load */
316             MAN_LOAD = 1;
317             MAN_LOAD = 0;
318     }
319
320     /***********************************************
321      *                 SET BPSK                    *
322      ***********************************************/
323     void set_bpsk(void)
324     {
325     word lower,upper;
326
327             /* enable 87C51 to write to RAM */
328             ena_ram();
329
330             /* get new center frequency */
331             printf(" Seting BPSK mode");
332
333             upper = 0x5000;
334             lower = 0x0000;
335
336             /* load LSB into memory RAM 1*/
337             XBYTE[RAM_1] = lower & 0x00ff;
338             XBYTE[RAM_2] = (lower >> 8) & 0x00ff;
339
340             /* load MSB into memory RAM 2*/
341             XBYTE[RAM_1+1] = upper & 0x00ff;
342             XBYTE[RAM_2+1] = (upper >> 8) & 0x00ff;
```

42

Navy Case No. 76,558

```
343         /* select which register to load in ALTERA */
344         XBYTE[EPM] = 0x0c| 0x20; /* enable center frequency & BPSK */
345
346         /* set max count registers in the ALTERA */
347         XBYTE[EPM+1] = 0xff;
348         XBYTE[EPM+2] = 0xff;
349
350         /* disable 87C51 from RAM */
351         dis_ram();
352
353         /* trigger a manual load */
354         MAN_LOAD = 1;
355         MAN_LOAD = 0;
356     }
357
358     /***********************************************
359     *                  HELP                        *
360     ***********************************************/
361     void help(void)
362     {
363     #if MAKE_ROOM
364         printf("\n\r I: input from external memory, enter <address>");
365         printf("\n\r O: output to external memory, enter <address data>");
366         printf("\n\r M: Manual toggle MAN_LOAD function");
367         printf("\n\r Q: quit debug");
368         printf("\n\r A: Reset G1 G2");
369         printf("\n\r B: Set G1 G2");
370         printf("\n\r C: Toggle Reset");
371         printf("\n\r D: Toggle DAC enable");
372         printf("\n\r E: Toggle Tri-State");
373         printf("\n\r F: Enter New Center Frequency");
374         printf("\n\r G: Reset Address Ports");
375         printf("\n\r H: Enter New Offset Frequency, FSK");
376         printf("\n\r J: Set for BPSK");
377         printf("\n\r R: RAM memory test");
378         printf("\n\r V: Show Version");
379     #endif
380     }
381
382     /* end */
```

Navy Case No. 76,558

```
1     /************************************************
2     *               DKW3                             *
3     *         EXTERNALS MODULE                       *
4     ************************************************/
5     /* filename: extern.h */
6
7     /************************************************
8     *         PORT DEFINITIONS                       *
9     ************************************************/
10    /* port 0, used for 8 bit address and data bus */
11    /* port 2, high byte address buss */
12    sbit G1 = 0x90;          /* tri-state control over RAM 2 output */
13    sbit G2 = 0x91;          /* tri-state control over RAM 2 output */
14    sbit TRI_STATE = 0x92;   /* tri-state 87C31 control over RAM */
15    sbit RESET = 0x93;       /* reset altera and NCO system */
16    sbit OES = 0x94;         /* enable NCO sine output, active low */
17    sbit OEC = 0x95;         /* enable NCO cosine output, active low */
18    sbit MAN_LOAD = 0x96;    /* enable manual load of data to NCO */
19    sbit SPARE = 0x97;
20
21    /* port 1, used for control input */
22
23    /* port 3, used for interrupt input, serial I/O, WR, RD */
24
25    /************************************************
26    *         GLOBAL VARIABLES                       *
27    ************************************************/
28    /* bit addressable memory */
29
30    /* global variables, internal data  */
31
32    /* serial I/O data space */
33    extern byte RX_buf[RX_BUF_SIZE];
34    extern byte RXhead;      /* start of data in buffer */
35    extern byte RXtail;      /* end of data in buffer */
36
37    /* end */
```

44

Navy Case No. 76,558

```
1    /***********************************************
2    *              DKW3                            *
3    *       FUNCTION DECLARATION MODULE            *
4    ************************************************/
5    /* file name: func-dec.h */
6
7    /* debug */
8    void debug(void);
9    void show_version(void);
10   void xram_test(void);
11   void help(void);
12   void set_cent_freq(void);
13   void set_offset_freq(void);
14   void toggle_man_load(void);
15   void toggle_dac_ena(void);
16   void reset_g1g2(void);
17   void set_g1g2(void);
18   void toggle_reset(void);
19   void toggle_tri_state(void);
20   void reset_addrs(void);
21
22   /* isr.c */
23   void hdlc_tx(void);
24   void rx_nrzi(void);
25   void cd_input(void);
26   void timer1_isr(void);
27   void serial_isr(void);
28
29   /* mod.c */
30   void main(void);
31   void ena_ram(void);
32   void dis_ram(void);
33
34   void test(void);
35
36   /* util.c */
37   void delay(int x);
38   void sleep(void);
39   void idle(void);
40   void pause(void);
41
42   /* serial.c */
43   void init_que(void);
44   unsigned char getq(void);
45   int putchar (char c);
46   char _getkey ();
47
48   /* init.c */
49   void init_timers(void);
50   void init_serial_port(void);
51   void init_87C51(void);
52
53   /* isr.c */
54   void serial_isr(void);
55
56   /* end */
```

Navy Case No. 76,558

```
1   /************************************************
2   *           8031 INITIALIZATION MODULE          *
3   ************************************************/
4   /* filename: init.c */
5
6   #include "mod.h"
7   #include "extern.h"
8   #include "funcdec.h"
9
10  /************************************************
11  *             INIT INTERVAL TIMER               *
12  ************************************************/
13  /*  Sets timer 0 to 8 bit auto reload mode
14      input is input is open
15
16      sets timer 1 to provide baud rate for the serial
17      port.  Clock is 11.059MHz.  Reload value in TH1 = ff
18      for 9600 baud
19  */
20  void init_timers(void)
21  {
22      /* set timer 0 for mode 1, set timer 1 to generate the baud rate */
23      TMOD = 0x26;    /* timer 1: baud rate generator
24                         gate = 0, gate not used
25                         C/T = 0, set for timer operation
26                         M1,M0 = 10, 8 bit auto reload
27
28                         timer 0:  not used
29                         gate = 0, gate not used
30                         C/T = 1, set to counter operation
31                         M1,M2 = 10, 8 bit auto reload
32                      */
33
34      TCON = 0x50;    /*
35                         TF1 = 0, timer 1 overflow flag
36                         TR1 = 1, timer 1 run control bit, set to run
37                         TF0 = 0, timer 0 overflow flag
38                         TR0 = 1, timer 0 run control bit
39                         ** external interrupts are not used **
40                         IE1 = 0, interrupt 1 edge flag
41                         IT1 = 0, interrupt 1 type control
42                         IE0 = 0, interrupt 0 edge flag
43                         IT0 = 0, interrupt 0 type control bit
44                      */
45      TH1 = 0xfd;     /* set reload value for timer */
46
47      ET0 = 1;    /* enable timer 0 interrupt */
48      ET1 = 0;    /* disable timer 1 interrupt */
49  }
50
51  /************************************************
52  *              INIT SERIAL PORT                 *
53  ************************************************/
54  /*  Sets timer/counter 1 to generate the
55      baud rate and Initializes the interrupt
56      vector. Serial port mode 1 is used.
57  */
```

Navy Case No. 76,558

```
58   void init_serial_port(void)
59   {
60       /* set serial port */
61       SCON = 0x50;    /*  SM0,SM1 = 0,1 mode 1
62                           SM2 = 0 not used
63                           REN = 1 enable serial interrupt
64                           TB8 = 0 9th data bit not used
65                           RB8 = 0 9th data bit not used
66                           TI = 0 transmit interrupt flag
67                           RI = 0 receive interrupt flag
68                           */
69
70       ES = 1;     /* enable serial port interrupt */
71       REN = 1;    /* enable serial reception */
72   }
73
74   /***********************************************
75   *              INIT 87C51                      *
76   ***********************************************/
77   /* All ports, internal registers and SFR
78      are set to starting know values.
79   */
80   void init_87C51(void)
81   {
82       /* disable all unused interrupts */
83       PCON = 0x00;            /* power control reg, smod = 0 */
84       IE = 0x80;              /* interrupt enable reg, none for now */
85       PS = 1;                 /* interrupt priority level
86                                  set serial port priority higher   */
87
88       /* set ports to initial value */
89       P0 = 0xff;    /* port 0 */
90       P1 = 0xff;    /* port 1 */
91       P2 = 0xff;    /* port 2 */
92       P3 = 0xff;    /* port 3 */
93
94   }
95
96   /* end */
```

Navy Case No. 76,558

```
1      /***********************************************
2      *                  DKW3                        *
3      *     I/O ADDRESS DEFINITIONS MODULE           *
4      ***********************************************/
5      /* filename: ioaddr.h */
6
7      /* RAM and ALTERA address */
8      #define RAM_1        0x0000
9      #define RAM_2        0x0800
10     #define EPM          0x1000
11     #define MODE         EPM+0
12     #define LSB_MAX_CNT  EPM+2
13     #define MSB_MAX_CNT  EPM+3
14
15     /* end */
```

Navy Case No. 76,558

```
1    /************************************************
2    *              ISR MODULE                       *
3    ************************************************/
4    /* filename: util.c */
5
6    #include "mod.h"
7    #include "extern.h"
8    #include "funcdec.h"
9
10   /************************************************
11   *           INTERVAL TIMER 0 ISR                *
12   ************************************************/
13   /*  timer 0
14
15   */
16   void hdlc_tx(void) interrupt 1 using 1
17   {
18   /* NOT USED */
19   }
20
21   /************************************************
22   *              EXTERNAL INTERRUPT 0             *
23   ************************************************/
24   /*  external interrupt 0
25   */
26   void rx_nrzi(void) interrupt 0 using 2
27   {
28   /* NOT USED */
29   }
30
31   /************************************************
32   *              EXTERNAL INTERRUPT 1             *
33   ************************************************/
34   /*  external interrupt 1
35   */
36   void cd_input(void) interrupt 2 using 2     /* change name later */
37   {
38   /* NOT USED */
39   }
40
41   /************************************************
42   *                  TIMER1 ISR                   *
43   ************************************************/
44   /* baud rate timer */
45   void timer1_isr(void) interrupt 3 using 1
46   {
47   /* NOT USED */
48   }
49
50   /************************************************
51   *                  SERIAL ISR                   *
52   ************************************************/
53   void serial_isr(void) interrupt 4 using 0
54   {
55        /* check for transmitter interrupt */
56        if(TI){
57            TI = 0;         /* TI bit must be cleared by software */
```

49

Navy Case No. 76,558

```
58         }
59
60         /* check for receiver interrupt */
61         if(RI){
62             RX_buf[RXtail] = SBUF;   /* get the char from the serial port */
63             RXtail++;                /* bump pointer */
64             if(RXtail == RX_BUF_SIZE) /* check for end of buffer */
65                 RXtail = 0;          /* yes - reset to buff start */
66             RI = 0;                  /* RI bit must be cleared by software */
67         }
68     }
69
70     /* end */
```

Navy Case No. 76,558

```
1   /***********************************************
2   *                    SIDS                      *
3   *         87C51 Digital Modulator Control      *
4   *                 21 OCT 1993                  *
5   ***********************************************/
6   /* filename: MOC.C */
7   /*
8       Digital Modulator Control software
9       copyright (c) Anthony Cirineo, 1993
10
11      Initialize RAM
12      Set mode in ALTERA
13
14      need to know bit rate
15      number of steps
16      step rate
17      center freq
18      modulation type
19
20      testing:
21      - no host interface required
22      - use spare inputs to select different test modes
23      - Modes: MSK, GMSK, BPSK, 8-PSK, CHIRP
24
25      On reset: processor initilize system,
26  */
27
28  #include "mod.h"
29  #include "funcdec.h"
30
31  /* 87C51 PORT USAGE
32          Port 0:  low address and data lines
33          Port 1:  general I/O
34          Port 2:  high address
35          Port 3:  serial I/O, timer counter input,
36                   external interrupts, RD, WR, special control lines
37              INT0:
38              INT1:
39              T0:
40              T1:
41  */
42
43  /* port 1 */
44  sbit G1 = 0x90;          /* tri-state control over RAM 2 output */
45  sbit G2 = 0x91;          /* tri-state control over RAM 2 output */
46  sbit TRI_STATE = 0x92;   /* tri-state 87C31 control over RAM */
47  sbit RESET = 0x93;       /* reset altera and NCO system */
48  sbit OES = 0x94;         /* enable NCO sine output, active low */
49  sbit OEC = 0x95;         /* enable NCO cosine output, active low */
50  sbit MAN_LOAD = 0x96;    /* enable manual load of data to NCO */
51  sbit SPARE = 0x97;
52
53  /* bit addressable memory */
54
55  /* global variables, residing in internal memory  */
56
57  /* serial I/O data storage */
```

Navy Case No. 76,558

```
58      byte RX_buf[RX_BUF_SIZE];      /* buffer for RS-232 receive */
59      byte RXhead;      /* start of data in buffer */
60      byte RXtail;      /* end of data in buffer */
61
62      /***********************************************
63       *                  MAIN                       *
64       ***********************************************/
65      void main(void)
66      {
67      word i,lower,upper;
68
69           /* initialize system */
70           init_87C51();
71           init_serial_port();
72           init_timers();
73           init_que();
74
75           /* power on initialization of NCO mode */
76           /* load center frequency, twice */
77
78
79           for(i=0;i <= 1;i++){
80                ena_ram();     /* enable 87C51 to write to RAM */
81                /* load LSB into memory RAM 1*/
82                lower = 0x0;
83                upper = 0x4c00; /* 9.5 MHz */
84                XBYTE[RAM_1] = lower & 0x00ff;
85                XBYTE[RAM_2] = (lower >> 8) & 0x00ff;
86
87                /* load MSB into memory RAM 2*/
88                XBYTE[RAM_1+1] = upper & 0x00ff;
89                XBYTE[RAM_2+1] = (upper >> 8) & 0x00ff;
90
91                /* select which register to load in ALTERA */
92                XBYTE[EPM] = 0x0c; /* enable center frequency register */
93
94                /* set max count registers in the ALTERA */
95                XBYTE[EPM+1] = 0xff;
96                XBYTE[EPM+2] = 0xff;
97
98                /* disable 87C51 from RAM */
99                dis_ram();
100
101               /* trigger a manual load */
102               MAN_LOAD = 1;
103               MAN_LOAD = 0;
104          }
105
106          /* load offset frequency */
107          ena_ram();     /* enable 87C51 to write to RAM */
108          lower = 0x0000;
109          upper = 0x0800; /* 1.0 MHz */
110          /* load LSB into memory RAM 1*/
111          XBYTE[RAM_1] = lower & 0x00ff;
112          XBYTE[RAM_2] = (lower >> 8) & 0x00ff;
113
114          /* load MSB into memory RAM 2*/
```

52

Navy Case No. 76,558

```
115         XBYTE[RAM_1+1] = upper & 0x00ff;
116         XBYTE[RAM_2+1] = (upper >> 8) & 0x00ff;
117
118         /* select which register to load in ALTERA */
119         XBYTE[EPM] = 0x08 | 0x02; /* enable offset frequency register, and FSK */
120
121         /* set max count registers in the ALTERA */
122         XBYTE[EPM+1] = 0xff;
123         XBYTE[EPM+2] = 0xff;
124
125         /* disable 87C51 from RAM */
126         dis_ram();
127
128         /* trigger a manual load */
129         MAN_LOAD = 1;
130         MAN_LOAD = 0;
131
132         OES = 0;    /* enable NCO sine output, active low */
133
134         debug();
135
136         /* main loop */
137         while(TRUE){
138         }
139    }
140
141    /************************************************
142     *              ENA RAM                         *
143     ************************************************/
144    /* allow the 87C51 to access the external RAM */
145    void ena_ram(void)
146    {
147         /* enable 54HC573 */
148         TRI_STATE = 0;
149         RESET = 0;  /* keep the ALTERA in reset */
150
151         /* enable 54HC241 buffer */
152         G1 = 0;
153         G2 = 1;
154
155         /* enable address ports */
156         P0 = 0xff;
157         P2 = 0xff;
158    }
159
160    /************************************************
161     *              DIS RAM                         *
162     ************************************************/
163    /* disable the 87C51 from the external RAM */
164    void dis_ram(void)
165    {
166         /* tri-state 54HC573 */
167         TRI_STATE = 1;
168         RESET = 1;  /* let the ALTERA run */
169
170         /* tri-state 54HC241 buffer */
171         G1 = 1;
```

53

Navy Case No. 76,558

```
172        G2 = 0;
173
174        /* enable address ports */
175        P0 = 0xff;
176        P2 = 0xff;
177    }
178
179    /* END */
```

Navy Case No. 76,558

```
1   /***********************************************
2    *                   MOD                        *
3    *          INCLUDE FILES & DEFINES             *
4    ***********************************************/
5   /* filename = mod.h */
6
7   /* compiler switches */
8   #pragma RB(0)       /* use register bank 0 */
9   #pragma ROM(compact) /* short jumps used within functions */
10  #pragma SMALL       /* internal memory used by default */
11  #pragma NOINTVECTOR /* interrupt vectors defined in startup.a51 */
12  #pragma SB          /* generate symbols */
13  #pragma CODE        /* append asm instructions to listing */
14  #pragma NOLC        /* include files will not appear listing file */
15
16  /* #pragma OE DB */       /* object file extensions in obj files for debug */
17  /* #pragma OBJECTEXTEND */
18
19  #include "stdio.h"
20  #include "ctype.h"
21  #include "reg51.h"
22  #include "absacc.h"
23  #include "ioaddr.h"
24
25  /* some defines */
26  #define Q_FAIL 0
27  #define Q_EMPTY 0
28  #define Q_FULL 1
29  #define TRUE -1
30  #define FALSE 0x00
31  #define VERSION " Ver 0.0 "
32
33  /* AXRX stuff */
34  #define RX_BUF_SIZE 5
35  #define FREE 0
36  #define FULL 1
37  #define MAXDATALEN 5
38
39  typedef unsigned char byte;
40  typedef unsigned int word;
41
42  /* #define inportb(a) XBYTE[a] */
43  /* #define outportb(a,b) XBYTE[a] = b */
44
45  /* END */
```

Navy Case No. 76,558

```
1      /***********************************************
2      *                NCO MODULE                    *
3      ***********************************************/
4      /* filename: nco.c */
5
6      #include "mod.h"
7      #include "extern.h"
8      #include "funcdec.h"
9
10     /* define NCO registers */
11     #define ENPOREG 1
12     #define ENOFREG 2
13     #define ENCFREG 3
14     #define ENPHAC 4
15     #define ENTIREG 5
16     #define INHOFR 6
17     #define INIPAC 7
18     #define INITAC 8
19
20     /* define NCO modes  <<<< FIX >>>> */
21     #define REG_MASK 0xe3
22     #define FSK 1
23     #define PSK 2
24     #define SLEW 3
25     #define QPSK 4
26     #define M8PSK 5
27
28     /* EPLD5128 contol registers */
29     #define BASE 0
30     #define mode_reg BASE+0
31     #define data_sel_reg BASE+1
32     #define max_count_lsb_reg BASE+2
33     #define max_count_msb_reg BASE+3
34
35     /* RAM Base addresses */
36     #define RAM1_BASE 0x0100
37     #define RAM2_BASE 0x0200
38
39
40     #if 0
41     static char old_mode;    /* */
42     static long temp;
43
44     void set_nco_reg(char mode);
45     void load_freq(long freq);
46
47
48     /***********************************************
49     *                RESET NCO                     *
50     ***********************************************/
51     /* set NCO to center frequency of 10MHz */
52     void reset_nco(void)
53     {
54         RESET = 1;            /* pull on reset line */
55         RESET = 0;
56         set_nco_reg(FSK);
57         load_freq(10000000);
```

Navy Case No. 76,558

```
 58     }
 59
 60     /************************************************
 61      *              LOAD NCO REGISTER              *
 62      ************************************************/
 63     void load_nco_reg(char reg,int lsb,int msb)
 64     {
 65
 66     }
 67
 68     /************************************************
 69      *              SET NCO REG                    *
 70      ************************************************/
 71     /* set enable registers in ALTERA */
 72     void set_nco_reg(char mode)
 73     {
 74     char temp;
 75
 76         temp = old_mode & REG_MASK;    /* mask off reg select bits */
 77         /* set the appropraite reg select bits */
 78         switch(mode){
 79             case FSK:
 80                 temp |= FSK;
 81                 break;
 82             case PSK:
 83                 temp |= PSK;
 84                 break;
 85             case SLEW:
 86                 temp |= SLEW;
 87                 break;
 88             case QPSK:
 89                 temp |= QPSK;
 90                 break;
 91             case M8PSK:
 92                 temp |= M8PSK;
 93                 break;
 94         }
 95         old_mode = temp;          /* save as old_mode */
 96         XBYTE[mode_reg] = temp;   /* write to ALTERA */
 97     }
 98
 99     /************************************************
100      *              LOAD FREQUNCY                  *
101      ************************************************/
102     /*
103     a) deselect SLEW and BFSK and reset RAM counter
104     1) write frequency data into RAM
105     2) write mod reg to select ENCFREG
106     3) toggle manual load
107     */
108     void load_freq(long freq)
109     {
110     union{
111         char c[4];
112         long num;
113     }p;
114
```

Navy Case No. 76,558

```
115         /* calculate frequency control value */
116         p.num = 1431655767;
117
118         XBYTE[RAM1_BASE]   = p.c[0];
119         XBYTE[RAM2_BASE]   = p.c[1];
120         XBYTE[RAM1_BASE+1] = p.c[2];
121         XBYTE[RAM2_BASE+1] = p.c[3];
122     }
123
124     /***********************************************
125      *           SET OFFSET FREQUNCY               *
126      ***********************************************/
127
128     #endif
129
130     /* END */
```

Navy Case No. 76,558

```
1    /* (c) Copyright FRANKLIN SOFTWARE, INC.  1989, 1990 All rights reserved. */
2    /* Register Declarations for 8051 Processor */
3
4    /*   BYTE Register   */
5    sfr P0   = 0x80;
6    sfr P1   = 0x90;
7    sfr P2   = 0xA0;
8    sfr P3   = 0xB0;
9    sfr PSW  = 0xD0;
10   sfr ACC  = 0xE0;
11   sfr B    = 0xF0;
12   sfr SP   = 0x81;
13   sfr DPL  = 0x82;
14   sfr DPH  = 0x83;
15   sfr PCON = 0x87;
16   sfr TCON = 0x88;
17   sfr TMOD = 0x89;
18   sfr TL0  = 0x8A;
19   sfr TL1  = 0x8B;
20   sfr TH0  = 0x8C;
21   sfr TH1  = 0x8D;
22   sfr IE   = 0xA8;
23   sfr IP   = 0xB8;
24   sfr SCON = 0x98;
25   sfr SBUF = 0x99;
26
27
28   /*   BIT Register   */
29   /*   PSW    */
30   sbit CY   = 0xD7;
31   sbit AC   = 0xD6;
32   sbit F0   = 0xD5;
33   sbit RS1  = 0xD4;
34   sbit RS0  = 0xD3;
35   sbit OV   = 0xD2;
36   sbit P    = 0xD0;
37
38   /*   TCON   */
39   sbit TF1  = 0x8F;
40   sbit TR1  = 0x8E;
41   sbit TF0  = 0x8D;
42   sbit TR0  = 0x8C;
43   sbit IE1  = 0x8B;
44   sbit IT1  = 0x8A;
45   sbit IE0  = 0x89;
46   sbit IT0  = 0x88;
47
48   /*   IE    */
49   sbit EA   = 0xAF;
50   sbit ES   = 0xAC;
51   sbit ET1  = 0xAB;
52   sbit EX1  = 0xAA;
53   sbit ET0  = 0xA9;
54   sbit EX0  = 0xA8;
55
56   /*   IP    */
57   sbit PS   = 0xBC;
```

Navy Case No. 76,558

```
58      sbit PT1  = 0xBB;
59      sbit PX1  = 0xBA;
60      sbit PT0  = 0xB9;
61      sbit PX0  = 0xB8;
62
63      /*  P3   */
64      sbit RD   = 0xB7;
65      sbit WR   = 0xB6;
66      sbit T1   = 0xB5;
67      sbit T0   = 0xB4;
68      sbit INT1 = 0xB3;
69      sbit INT0 = 0xB2;
70      sbit TXD  = 0xB1;
71      sbit RXD  = 0xB0;
72
73      /*  SCON  */
74      sbit SM0  = 0x9F;
75      sbit SM1  = 0x9E;
76      sbit SM2  = 0x9D;
77      sbit REN  = 0x9C;
78      sbit TB8  = 0x9B;
79      sbit RB8  = 0x9A;
80      sbit TI   = 0x99;
81      sbit RI   = 0x98;
```

60

Navy Case No. 76,558

```
1    /* (c) Copyright FRANKLIN SOFTWARE, INC. 1989, 1990 All rights reserved. */
2    /* Register Declarations for 8051 Processor */
3
4    /*  BYTE Register   */
5    sfr P0   = 0x80;
6    sfr P1   = 0x90;
7    sfr P2   = 0xA0;
8    sfr P3   = 0xB0;
9    sfr PSW  = 0xD0;
10   sfr ACC  = 0xE0;
11   sfr B    = 0xF0;
12   sfr SP   = 0x81;
13   sfr DPL  = 0x82;
14   sfr DPH  = 0x83;
15   sfr PCON = 0x87;
16   sfr TCON = 0x88;
17   sfr TMOD = 0x89;
18   sfr TL0  = 0x8A;
19   sfr TL1  = 0x8B;
20   sfr TH0  = 0x8C;
21   sfr TH1  = 0x8D;
22   sfr IE   = 0xA8;
23   sfr IP   = 0xB8;
24   sfr SCON = 0x98;
25   sfr SBUF = 0x99;
26
27
28   /*  BIT Register   */
29   /*  PSW    */
30   sbit CY   = 0xD7;
31   sbit AC   = 0xD6;
32   sbit F0   = 0xD5;
33   sbit RS1  = 0xD4;
34   sbit RS0  = 0xD3;
35   sbit OV   = 0xD2;
36   sbit P    = 0xD0;
37
38   /*  TCON   */
39   sbit TF1  = 0x8F;
40   sbit TR1  = 0x8E;
41   sbit TF0  = 0x8D;
42   sbit TR0  = 0x8C;
43   sbit IE1  = 0x8B;
44   sbit IT1  = 0x8A;
45   sbit IE0  = 0x89;
46   sbit IT0  = 0x88;
47
48   /*  IE    */
49   sbit EA   = 0xAF;
50   sbit ES   = 0xAC;
51   sbit ET1  = 0xAB;
52   sbit EX1  = 0xAA;
53   sbit ET0  = 0xA9;
54   sbit EX0  = 0xA8;
55
56   /*  IP    */
57   sbit PS   = 0xBC;
```

Navy Case No. 76,558

```
58      sbit PT1   = 0xBB;
59      sbit PX1   = 0xBA;
60      sbit PT0   = 0xB9;
61      sbit PX0   = 0xB8;
62
63      /*  P3   */
64      sbit RD    = 0xB7;
65      sbit WR    = 0xB6;
66      sbit T1    = 0xB5;
67      sbit T0    = 0xB4;
68      sbit INT1  = 0xB3;
69      sbit INT0  = 0xB2;
70      sbit TXD   = 0xB1;
71      sbit RXD   = 0xB0;
72
73      /*  SCON  */
74      sbit SM0   = 0x9F;
75      sbit SM1   = 0x9E;
76      sbit SM2   = 0x9D;
77      sbit REN   = 0x9C;
78      sbit TB8   = 0x9B;
79      sbit RB8   = 0x9A;
80      sbit TI    = 0x99;
81      sbit RI    = 0x98;
```

Navy Case No. 76,558

```
1    /************************************************
2    *            SERIAL INTERFACE MODULE            *
3    *************************************************/
4    /* filename: serial.c */
5
6    #include "mod.h"
7    #include "extern.h"
8    #include "funcdec.h"
9
10   /************************************************
11   *                 PUTCHAR                       *
12   *************************************************/
13   int putchar (char c)
14   {
15       ES = 0;         /* disable serial port interrupts */
16
17       SBUF = c;
18       while(!TI);     /* loop until TI flag is high */
19
20       /* reset serial port */
21       TI = 0;         /* clear interrupt flags */
22       ES = 1;         /* enable serial interrupts */
23       return c;
24   }
25
26   /************************************************
27   *                 _GETKEY                       *
28   *************************************************/
29   char _getkey ()
30   {
31       while(RXhead == RXtail);
32       return(getq());
33   }
34
35   /************************************************
36   *                 INIT QUE                      *
37   *************************************************/
38   /* initialize a queue */
39   void init_que(void)
40   {
41       RXhead = RXtail = 0;
42   }
43
44   /************************************************
45   *                  GETQ                         *
46   *************************************************/
47   /* get char from the Q */
48   unsigned char getq(void)
49   {
50   unsigned char c;
51
52       c = RX_buf[RXhead];    /* get the char */
53       RXhead++;              /* bump pointer */
54       if(RXhead == RX_BUF_SIZE) /* check for end of buffer */
55           RXhead = 0;        /* yes - reset to buff start */
56       return(c);
57   }
```

63

Navy Case No. 76,558

58    /* end */

Navy Case No. 76,558

```
1    /* (c) Copyright FRANKLIN SOFTWARE, INC. 1989, 1990 All rights reserved. */
2    /* STDIO.H: prototypes for standard i/o functions, ver. 1.2 */
3
4    #ifndef EOF
5    #define EOF -1
6    #endif
7
8    extern char _getkey ();
9    extern char getchar ();
10   extern char ungetchar (char);
11   extern int putchar (char);
12   extern int printf (const char *, ...);
13   extern int sprintf (char *, const char *, ...);
14   extern char *gets (char *, int n);
15   extern int scanf (const char *, ...);
16   extern int sscanf (char *, const char *, ...);
17   extern int puts (const char *);
```

Navy Case No. 76,558

```
1     /************************************************
2     *              UTIL MODULE                      *
3     *************************************************/
4     /* filename: util.c */
5
6     #include "mod.h"
7     #include "extern.h"
8     #include "funcdec.h"
9
10    #if 0
11    /************************************************
12    *                IDLE                           *
13    *************************************************/
14    /* called when waiting for one stream to clear */
15    void idle(void)
16    {
17    }
18
19    /************************************************
20    *                SLEEP                          *
21    *************************************************/
22    void sleep(void)
23    {
24        /* check all ques first */
25        PCON = 0x01;    /* put CPU into idle mode */
26    }
27
28    /************************************************
29    *                DELAY                          *
30    *************************************************/
31    /* delay(1) = 6.5 usec, with 11.059 MHz clock */
32    void delay(int x)
33    {
34    word i,j;
35
36        for(i = 0;i < x;i++)        /* about 14 cycles */
37            for(j = 0;j < 163;j++); /* about 17 cycles */
38    }
39
40    /*******************************************
41    *              PAUSE                       *
42    ********************************************/
43    /* this routine will pause the program and
44       wait for any key to be hit before continuing
45    */
46    void pause(void)
47    {
48        _getkey();
49    }
50    #endif
51
52    /* end */
```

Navy Case No. 76,558

Appendix B

```
1    Name         MOD;
2    Partno       GAL20V8A;
3    Date         10/19/93;
4    Revision     01;
5    Designer     Anthony Cirineo;
6    Company      Naval Air Warefare Center, Weapons Division;
7    Assembly     SIDS DIGITAL MODULATOR;
8    Location     U7;
9    device       G20V8A;
10   format       j;
11
12   /*************************************************/
13   /*     PROGRAMMABLE LOGIC FOR SIDS MODULATOR    */
14   /*           Target Device:  GAL20V8A            */
15   /*************************************************/
16
17   /** Inputs **/
18   pin 1 = clk;                /* clock input for all output flops, not used */
19   pin 2 = Tri_state;          /* tri-state certain outputs */
20   pin 3 = A0;                 /* */
21   pin [4..6] = [A11..A13];    /* address inputs */
22   pin 7 = WR;                 /* WR line from 87C51 */
23   pin 8 = RD;                 /* RD line from 87C51 */
24
25   /** Outputs **/
26   pin 22 = !CS_EMP5128;
27   pin 21 = !CS_RAM1;
28   pin 20 = !CS_RAM2;
29   pin 19 = !OE_RAM;
30
31   /** Logic Equations **/
32   CS_EMP5128 = !WR & A12;
33   CS_RAM1 =  !WR & !A11 & !A12;
34   CS_RAM2 =  !WR & A11 & !A12;
35   OE_RAM = RD;
36
37   /* enable all outputs */
38   CS_EMP5128.oe = 'b'1;
39   CS_RAM1.oe = Tri_state;
40   CS_RAM2.oe = Tri_state;
41   OE_RAM.oe = Tri_state;
42
43   /* end */
```

Navy Case No. 76,558

Appendix C

```
1   %************************************************
2   *          REG CONTROLLER                        *
3   *          ANTHONY CIRINEO                       *
4   *              8/25/93                           *
5   ************************************************%
6   %
7       THIS CIRCUIT CONTROLS THE ALTERA MODES
8   %
9
10  TITLE "REG CONTROLLER";
11
12  DESIGN IS "REG";
13
14  SUBDESIGN REG
15  (
16      DATA[7..0]        :INPUT;     % CONTROL DATA FOR ALTERA %
17      ADDRS[3..0]       :INPUT;     % ADDRESS REGS FOR ALTERA %
18      WR                :INPUT;     % WRITE ENABLE %
19      CS                :INPUT;     % CHIP SELECT FOR CONTROL REGISTERS %
20
21      MODE[7..0]        :OUTPUT;    % VARIOUS DDS MODES %
22      MAX_COUNT[10..0]  :OUTPUT;    % MAXIMUM COUNT FOR VARIOUS MODES %
23  )
24
25  VARIABLE
26
27      D0[7..0] : DFF;
28      D1[7..0] : DFF;
29      D2[7..0] : DFF;
30
31  BEGIN
32
33      D0[7..0].D = DATA[7..0];
34      D1[7..0].D = DATA[7..0];
35      D2[7..0].D = DATA[7..0];
36
37      D0[7..0].PRN = VCC;
38      D1[7..0].PRN = VCC;
39      D2[7..0].PRN = VCC;
40      D0[7..0].CLRN = VCC;
41      D1[7..0].CLRN = VCC;
42      D2[7..0].CLRN = VCC;
43
44      MODE[7..0]        = D0[7..0].Q;
45      MAX_COUNT[7..0]   = D1[7..0].Q;
46      MAX_COUNT[10..8]  = D2[2..0].Q;
47
48      CASE (ADDRS[]) IS
49          WHEN 0 =>
50              D0[7..0].CLK = (!WR & !CS);      % latch mode %
51          WHEN 2 =>
52              D1[7..0].CLK = (!WR & !CS);      % latch max count %
53          WHEN 3 =>
54              D2[7..0].CLK = (!WR & !CS);      % latch max count %
55      END CASE;
```

Navy Case No. 76,558

```
56    END;
57
58    % END %
```

Navy Case No. 76,558

```
1     %***********************************************
2     *          NCO DMA CONTROLLER                  *
3     *              ANTHONY CIRINEO                 *
4     *                  8/24/93                     *
5     ************************************************%
6     %
7          THIS CIRCUIT TRANSFERS TWO 16 BIT WORDS
8          FROM RAM TO THE INPUT REGISTERS OF THE NCO,
9          THEN ENABLES THE 32 BIT WORD TO THE DIFFERENT
10         REGISTERS.
11
12         ALSO IT REQUESTS A RAM ADDRESS INCREMENT.
13
14         RESET = GND causes RAM_CS1, RAM_CS2 and RAM_OE to
15         tri-state
16    %
17
18    TITLE "NCO DMA CONTROLLER";
19
20    DESIGN IS "DMACTRL";
21
22    SUBDESIGN DMACTRL
23    (
24         SYS_CLK          :INPUT;      % SYSTEM CLOCK %
25         RESET            :INPUT;      % SYSTEM RESET %
26         LOAD             :INPUT;      % START A DMA TRANSFER %
27         REG_SEL[2..0]    :INPUT;      % SELECTS NCO REG TO LOAD %
28
29         NCO_A[2..0]      :OUTPUT;
30         NCO_CS           :OUTPUT;
31         NCO_WR           :OUTPUT;
32         NCO_LOAD_REG     :OUTPUT;
33         RAM_OE           :OUTPUT;
34         RAM_CS1          :OUTPUT;
35         RAM_CS2          :OUTPUT;
36
37         FREQ_INC         :OUTPUT;
38    )
39
40
41    VARIABLE
42
43    RUN : DFF;
44    R_CS1 : TRI;
45    R_CS2 : TRI;
46    R_OE : TRI;
47
48    CNTRL : MACHINE OF BITS ( Q[2..0] )
49            WITH STATES(
50                S0 = 0,       % POWER UP %
51                S1 = 1,       % IDEL STATE %
52                S2 = 2,       % ASSERT RAM & NCO ADDR, CS, OE, WR %
53                S3 = 3,       % DEASSERT NCO WR %
54                S4 = 4,       % DEASSERT RAM & NCO CS, OE, INC ADDRESS %
55                S5 = 5,       % ASSERT RAM & NCO ADDR, CS, OE, WR %
56                S6 = 6,       % DEASSERT NCO WR%
57                S7 = 7        % DEASSERT RAM & NCO CS, OE, INC ADDRESS %
```

Navy Case No. 76,558

```
58              );
59
60       BEGIN
61
62           CNTRL.CLK = SYS_CLK;
63           CNTRL.RESET = !RESET;
64           CNTRL.ENA = RUN.Q;
65
66           RUN.CLK = LOAD;
67           RUN.D = VCC;
68           RUN.CLRN = !S7;
69           RUN.PRN = VCC;
70
71           RAM_CS1 = R_CS1.OUT;
72           RAM_CS2 = R_CS2.OUT;
73           RAM_OE = R_OE.OUT;
74
75           R_CS1.OE = RESET;
76           R_CS2.OE = RESET;
77           R_OE.OE = RESET;
78
79           CASE (CNTRL) IS
80               WHEN S0 =>         % POWER UP %
81                   R_CS1 = VCC;
82                   R_CS2 = VCC;
83                   R_OE = VCC;
84                   NCO_CS = VCC;
85                   NCO_WR = VCC;
86                   NCO_LOAD_REG = GND;
87                   FREQ_INC = GND;
88                   NCO_A[] = 0;
89                   CNTRL = S1;
90               WHEN S1 =>         % IDEL STATE, same as power up %
91                   R_CS1 = VCC;
92                   R_CS2 = VCC;
93                   R_OE = VCC;
94                   NCO_CS = VCC;
95                   NCO_WR = VCC;
96                   NCO_LOAD_REG = GND;
97                   FREQ_INC = GND;
98                   NCO_A[] = 0;
99                   CNTRL = S2;
100              WHEN S2 =>         % ASSERT RAM & NCO ADDR, CS, OE, WR %
101                  R_CS1 = GND;
102                  R_CS2 = GND;
103                  R_OE = GND;
104                  NCO_CS = GND;
105                  NCO_WR = GND;
106                  NCO_LOAD_REG = GND;
107                  FREQ_INC = GND;
108                  CASE REG_SEL[] IS
109                      WHEN 2 =>              % ENOFREG %
110                          NCO_A[] = 2;       % LOAD LEAST SIG BITS %
111                      WHEN 3 =>              % ENCFREG %
112                          NCO_A[] = 0;       % LOAD LEAST SIG BITS %
113                      WHEN OTHERS =>
114                          NCO_A[] = 0;
```

71

Navy Case No. 76,558

```
115            END CASE;
116            CNTRL = S3;
117        WHEN S3 =>           % DEASSERT NCO WR %
118            R_CS1 = GND;
119            R_CS2 = GND;
120            R_OE = GND;
121            NCO_CS = GND;
122            NCO_WR = VCC;
123            NCO_LOAD_REG = GND;
124            FREQ_INC = GND;
125            CASE REG_SEL[] IS
126                WHEN 2 =>            % ENOFREG %
127                    NCO_A[] = 2;     % LOAD LEAST SIG BITS %
128                WHEN 3 =>            % ENCFREG %
129                    NCO_A[] = 0;     % LOAD LEAST SIG BITS %
130                WHEN OTHERS =>
131                    NCO_A[] = 0;
132            END CASE;
133            CNTRL = S4;
134        WHEN S4 =>           % DEASSERT RAM & NCO CS, OE, INC ADDRESS %
135            R_CS1 = VCC;
136            R_CS2 = VCC;
137            R_OE = VCC;
138            NCO_CS = VCC;
139            NCO_WR = VCC;
140            NCO_LOAD_REG = GND;
141            FREQ_INC = VCC;
142            CASE REG_SEL[] IS
143                WHEN 2 =>            % ENOFREG %
144                    NCO_A[] = 3;     % LOAD MOST SIG BITS %
145                WHEN 3 =>            % ENCFREG %
146                    NCO_A[] = 1;     % LOAD MOST SIG BITS %
147                WHEN OTHERS =>
148                    NCO_A[] = 0;
149            END CASE;
150            CNTRL = S5;
151        WHEN S5 =>           % ASSERT RAM & NCO ADDR, CS, OE, WR %
152            R_CS1 = GND;
153            R_CS2 = GND;
154            R_OE = GND;
155            NCO_CS = GND;
156            NCO_WR = GND;
157            NCO_LOAD_REG = GND;
158            FREQ_INC = GND;
159            CASE REG_SEL[] IS
160                WHEN 2 =>            % ENOFREG %
161                    NCO_A[] = 3;     % LOAD MOST SIG BITS %
162                WHEN 3 =>            % ENCFREG %
163                    NCO_A[] = 1;     % LOAD MOST SIG BITS %
164                WHEN OTHERS =>
165                    NCO_A[] = 0;
166            END CASE;
167            CNTRL = S6;
168        WHEN S6 =>           % DEASSERT NCO WR%
169            R_CS1 = GND;
170            R_CS2 = GND;
171            R_OE = GND;
```

Navy Case No. 76,558

```
172                 NCO_CS = GND;
173                 NCO_WR = VCC;
174                 NCO_LOAD_REG = GND;
175                 FREQ_INC = GND;
176                 CASE REG_SEL[] IS
177                     WHEN 2 =>              % ENOFREG %
178                         NCO_A[] = 3;       % LOAD MOST SIG BITS %
179                     WHEN 3 =>              % ENCFREG %
180                         NCO_A[] = 1;       % LOAD MOST SIG BITS %
181                     WHEN OTHERS =>
182                         NCO_A[] = 0;
183                 END CASE;
184                 CNTRL = S7;
185             WHEN S7 =>           % DEASSERT RAM & NCO CS, OE, INC ADDRESS %
186                 R_CS1 = VCC;
187                 R_CS2 = VCC;
188                 R_OE = VCC;
189                 NCO_CS = VCC;
190                 NCO_WR = VCC;
191                 NCO_LOAD_REG = VCC;
192                 FREQ_INC = VCC;
193                 NCO_A[] = 0;
194                 CNTRL = S1;
195         END CASE;
196     END;
197
198     % END %
```

Navy Case No. 76,558

```
1   %*********************************************
2   *          NCO REGISTER CONTROLLER           *
3   *              ANTHONY CIRINEO               *
4   *                  8/24/93                   *
5   *********************************************%
6   %
7       THIS CIRCUIT CONTROLS THE REGISTER SELECTS
8       ON THE HARRIS NCO.
9
10  %
11
12  TITLE "NCO REGISTER CONTROLLER";
13
14  DESIGN IS "NCO_CTRL";
15
16  SUBDESIGN NCO_CTRL
17  (
18      REG_SEL[2..0]   :INPUT;    % SELECTS NCO REG TO LOAD %
19      NCO_LOAD_REG    :INPUT;    % STROB DATA INTO NCO REGISTER %
20
21      EN_PO_REG       :OUTPUT;   % ENA DATA TO BE CLK INTO PHASE OFFSET REG %
22      EN_OF_REG       :OUTPUT;   % ENA DATA TO BE CLK INTO OFFSET FREQ REG %
23      EN_CF_REG       :OUTPUT;   % ENA DATA TO BE CLK INTO CENTER FREQ REG %
24      EN_TI_REG       :OUTPUT;   % ENA DATA TO BE CLK INTO TIMER INCR REG %
25      INIT_PAC        :OUTPUT;   % ZEROS FEED BACK PATH IN PHASE ACC %
26      INIT_TAC        :OUTPUT;   % ACTIVE LOW, INIT TIMER ACC %
27  )
28
29  VARIABLE
30
31  _EN_PO_REG : NODE;
32  _EN_OF_REG : NODE;
33  _EN_CF_REG : NODE;
34  _EN_TI_REG : NODE;
35  _INIT_PAC  : NODE;
36  _INIT_TAC  : NODE;
37
38  BEGIN
39
40      EN_PO_REG = !_EN_PO_REG;
41      EN_OF_REG = !_EN_OF_REG;
42      EN_CF_REG = !_EN_CF_REG;
43      EN_TI_REG = !_EN_TI_REG;
44      INIT_PAC  = !_INIT_PAC;
45      INIT_TAC  = !_INIT_TAC;
46
47      CASE REG_SEL[] IS
48          WHEN 0 =>            % function disabled %
49              EN_PO_REG = VCC;
50              EN_OF_REG = VCC;
51              EN_CF_REG = VCC;
52              EN_TI_REG = VCC;
53              INIT_PAC  = VCC;
54              INIT_TAC  = VCC;
55          WHEN 1 =>
56              _EN_PO_REG = NCO_LOAD_REG;
57          WHEN 2 =>
```

Navy Case No. 76,558

```
58                _EN_OF_REG = NCO_LOAD_REG;
59            WHEN 3 =>
60                _EN_CF_REG = NCO_LOAD_REG;
61            WHEN 4 =>
62                _EN_TI_REG = NCO_LOAD_REG;
63            WHEN 5 =>
64                _INIT_PAC = NCO_LOAD_REG;
65            WHEN 6 =>
66                _INIT_TAC = NCO_LOAD_REG;
67         END CASE;
68
69   END;
70
71   % END %
```

Navy Case No. 76,558

```
1    %***********************************************
2    *            RAM ADDRESS CONTROLLER            *
3    *                ANTHONY CIRINEO               *
4    *                   8/25/93                    *
5    ***********************************************%
6    %
7        THIS CIRCUIT CONTROLS THE ADDRESS LINES
8        TO THE RAM
9    %
10
11   TITLE "RAM ADDRESS CONTROLLER";
12
13   DESIGN IS "RAM_ADRS";
14
15   SUBDESIGN RAM_ADRS
16   (
17       ZERO_CNT         :INPUT;      % SETS COUNT TO ZERO %
18       FREQ_INC         :INPUT;      % INC ADDRESS TO RAM %
19       RESET            :INPUT;      % TRI STATES ADDRESS LINES %
20
21       RAM_A[10..0]     :OUTPUT;
22       RAM_AT[10..0]    :OUTPUT;
23
24   )
25
26   VARIABLE
27       COUNT[10..0] : DFF;
28       T[10..0] : TRI;
29
30   BEGIN
31       COUNT[].CLK = FREQ_INC;
32       COUNT[].CLRN = !ZERO_CNT & RESET;
33        COUNT[].PRN = VCC;
34
35       T[].IN = COUNT[];
36       RAM_A[] = COUNT[];
37       T[].OE = RESET;
38       RAM_AT[] = T[].OUT;
39
40         COUNT[].D = COUNT[].Q + 1;
41
42   END;
43
44    % END %
```

76

Navy Case No. 76,558

```
1    %***********************************************
2    *          RAM ADDRESS COMPARATOR              *
3    *               ANTHONY CIRINEO                *
4    *                  8/25/93                     *
5    ************************************************%
6    %
7        THIS CIRCUIT COMPARES THE CURRENT RAM
8        ADDRESS TO THE MAX_COUNT INPUT.
9
10       GENERATED TWO OUTPUTS:
11       EQUAL MAX AND HALF MAX
12   %
13
14   TITLE "RAM ADDRESS COMPARATOR";
15
16   DESIGN IS "ADDCOMP";
17
18   SUBDESIGN ADDCOMP
19   (
20       MAX_COUNT[10..0]    :INPUT;
21       RAM_A[10..0]        :INPUT;
22
23       EQUAL_MAX           :OUTPUT;
24       HALF_MAX            :OUTPUT;
25   )
26
27   BEGIN
28
29       IF (MAX_COUNT[] == RAM_A[]) THEN
30           EQUAL_MAX = VCC;
31       ELSE
32           EQUAL_MAX = GND;
33       END IF;
34
35       IF (RAM_A[9..0] < MAX_COUNT[10..1]) THEN
36           HALF_MAX = VCC;
37       ELSE
38           HALF_MAX = GND;
39       END IF;
40
41   END;
42
43   % END %
```

Navy Case No. 76,558

```
1    %*********************************************
2    *              SLEW CONTROLLER              *
3    *              ANTHONY CIRINEO              *
4    *                 8/25/93                   *
5    *********************************************%
6    %
7         THIS CIRCUIT CONTROL THE SLEW MODE
8         LOAD CAUSES A DMA REQUEST
9
10        POS GOING DATA CAUSES FREQ TO STEP TO HALF_MAX.
11        NEG GOING DATA CAUSES FREQ TO STEP TO FULL_MAX.
12        NEW FREQS ARE WRITEN AT STEP_CLOCK RATE
13
14   %
15
16   TITLE "SLEW CONTROLLER";
17
18   DESIGN IS "SLEW";
19
20   SUBDESIGN SLEW
21   (
22        EQUAL_MAX       :INPUT;     % RAM ADDRESS EQUALS MAX COUNT %
23        HALF_MAX        :INPUT;     % RAM ADDRESS EQUALS 1/2 MAX COUNT %
24        DATA            :INPUT;     % SERIAL DATA INPUT %
25        SYS_CLK         :INPUT;     % SYSTEM CLOCK %
26        STEP_CLK        :INPUT;     % FREQUENCY STEP CLOCK %
27        MODE_ENA        :INPUT;     % ENABLES THIS MODE %
28
29        LOAD            :OUTPUT;    % CALLS FOR NEW DMA LOAD %
30        RESET_COUNT     :OUTPUT;    % RESETS ADDRESS COUNTER %
31   )
32
33   VARIABLE
34
35        RUN : DFF;
36
37   BEGIN
38
39        RUN.CLK = HALF_MAX & EQUAL_MAX;
40        RUN.D = VCC;
41        RUN.CLRN = SYS_CLK;
42        RUN.PRN = VCC;
43        RESET_COUNT = RUN.Q;
44
45        IF (MODE_ENA & DATA & !HALF_MAX) THEN
46             LOAD = STEP_CLK;       % LOWER PART OF COUNT %
47        END IF;
48        IF (MODE_ENA & !DATA & !EQUAL_MAX) THEN
49             LOAD = STEP_CLK;       % UPPER PART OF COUNT %
50        END IF;
51
52   END;
53
54   % END %
```

78

Navy Case No. 76,558

```
1   %**********************************************
2   *              BFSK CONTROLLER               *
3   *              ANTHONY CIRINEO               *
4   *                 8/25/93                    *
5   **********************************************%
6   %
7       THIS CIRCUIT CONTROLS THE BFSK MODE IN THE DDS
8       INH_OF_REG:  IN THIS MODE SELECTS BETWEEN THE TWO
9           PROGRAMMED FREQUENCIES
10  %
11
12  TITLE "BFSK CONTROLLER";
13
14  DESIGN IS "BFSK";
15
16  SUBDESIGN BFSK
17  (
18      DATA            :INPUT;     % SERIAL DATA INPUT %
19      MODE_ENA        :INPUT;     % ENABLES THIS MODE %
20
21      INH_OF_REG      :OUTPUT;
22  )
23
24
25  BEGIN
26
27      IF (MODE_ENA) THEN
28          INH_OF_REG = DATA;
29      END IF;
30
31  END;
32
33  % END %
```

Navy Case No. 76,558

```
1      %***********************************************
2      *             MCELL10 BUFFER                    *
3      *             ANTHONY CIRINEO                   *
4      *                8/25/93                        *
5      ***********************************************%
6      %
7          THIS CIRCUIT IS A 10 INPUT, 10 OUTPUT MCELL BUFFER
8      %
9
10     TITLE "10 IN 10 OUT MCELL";
11
12     DESIGN IS "MCELL10";
13
14     SUBDESIGN MCELL10
15     (
16         IN[10..0]      :INPUT;
17         OUT[10..0]     :OUTPUT;
18     )
19
20     VARIABLE
21         A[10..0] : SOFT;
22
23     BEGIN
24
25         A[10..0] = IN[10..0];
26         OUT[10..0] = A[10..0];
27
28     END;
29
30     % END %
```

Navy Case No. 76,558

```
1    %***********************************************
2    *              MCELL3 BUFFER                   *
3    *              ANTHONY CIRINEO                 *
4    *                 8/25/93                      *
5    ***********************************************%
6    %
7         THIS CIRCUIT IS A 3 INPUT, 3 OUTPUT MCELL BUFFER
8    %
9
10   TITLE "3 IN 3 OUT MCELL";
11
12   DESIGN IS "MCELL3";
13
14   SUBDESIGN MCELL3
15   (
16       IN[2..0]      :INPUT;
17       OUT[2..0]     :OUTPUT;
18   )
19
20   VARIABLE
21       A[2..0] : SOFT;
22
23   BEGIN
24
25       A[2..0] = IN[2..0];
26       OUT[2..0] = A[2..0];
27
28   END;
29
30   % END %
```

Navy Case No. 76,558

```
1       %*********************************************
2       *              PSK CONTROLLER                *
3       *              ANTHONY CIRINEO               *
4       *                 8/25/93                    *
5       *********************************************%
6       %
7           THIS CIRCUIT CONTROLS THE ADDRESS LINES
8           TO THE RAM
9       %
10
11      TITLE "PSK CONTROLLER";
12
13      DESIGN IS "PSK";
14
15      % SUBDESIGN PSK %
16
17
18      SUBDESIGN PSK
19      (
20          MODE_SEL[2..0]  :INPUT;     % SELECTS WHAT PSK MODE TO ENABLE %
21          DATA            :INPUT;     % DATA INPUT %
22          DATA_CLK        :INPUT;     % DATA CLOCK %
23
24          EN_PO_REG       :OUTPUT;    % ENA DATA TO BE CLK INTO PHASE OFFSET REG %
25          MOD[2..0]       :OUTPUT;    % MODULATION CONTROL INPUT %
26          PM_SEL          :OUTPUT;    % PHASE MODULATION SELECT INPUT %
27      )
28
29      VARIABLE
30
31      REG[2..0] :DFF;             % REGS TO USE AS SHIFT %
32      OUT[2..0] :DFF;             % LATCHED MOD OUT PUTS %
33      P[2..0]   :NODE;            % POSSIBLE PHASE STATES %
34
35      CNT: MACHINE OF BITS (Q[1..0]) % COUNT DATA CLOCK TRANSISTIONS %
36          WITH STATES(
37              S0 = 0,
38              S1 = 1,
39              S2 = 2,
40              S3 = 3
41          );
42
43      BEGIN
44
45      REG[].CLK = DATA_CLK;
46      REG[0].D = DATA;
47      REG[1].D = REG[0].Q;
48      REG[2].D = REG[1].Q;
49      REG[].CLRN = VCC;
50      REG[].PRN = VCC;
51
52      CNT.CLK = DATA_CLK;
53
54      MOD[] = OUT[];      % LATCHED STATE OF P %
55      OUT[] = P[];
56
57          CASE (CNT) IS
```

Navy Case No. 76,558

```
58          WHEN S0 =>
59              OUT[].CLK = GND;
60              CNT = S1;
61          WHEN S1 =>
62              IF(MODE_SEL[] == 2) THEN
63                  OUT[].CLK = VCC;
64              ELSE
65                  OUT[].CLK = GND;
66              END IF;
67              CNT = S2;
68          WHEN S2 =>
69              OUT[].CLK = GND;
70              CNT = S3;
71          WHEN S3 =>
72              IF((MODE_SEL[] == 2) # (MODE_SEL[] == 3)) THEN
73                  OUT[].CLK = VCC;
74              ELSE
75                  OUT[].CLK = GND;
76              END IF;
77              CNT = S0;
78      END CASE;
79
80      CASE (MODE_SEL[]) IS
81          WHEN 0 =>                % MODE DISABLED %
82              PM_SEL = VCC;
83              EN_PO_REG =   VCC;
84          WHEN 1 =>                % BPSK %
85              PM_SEL = GND;
86              IF (DATA == 0) THEN  % SEND 0 PHASE %
87                  MOD[0] = GND;
88                  MOD[1] = GND;
89                  MOD[2] = GND;
90              ELSE                 % SEND 180 PHASE %
91                  MOD[0] = GND;
92                  MOD[1] = VCC;
93                  MOD[2] = VCC;
94              END IF;
95          WHEN 2 =>                % QPSK %
96              PM_SEL = GND;
97              IF(Q[] == 0 # Q[] == 2) THEN
98                  CASE (REG[]) IS
99                      WHEN 0 =>        % SEND 0 PHASE %
100                         P[0] = GND;
101                         P[1] = GND;
102                         P[2] = GND;
103                     WHEN 1 =>        % SEND 90 PHASE %
104                         P[0] = GND;
105                         P[1] = VCC;
106                         P[2] = GND;
107                     WHEN 2 =>        % SEND 180 PHASE %
108                         P[0] = GND;
109                         P[1] = VCC;
110                         P[2] = VCC;
111                     WHEN 3 =>        % SEND 270 PHASE %
112                         P[0] = GND;
113                         P[1] = GND;
114                         P[2] = VCC;
```

83

Navy Case No. 76,558

```
115             END CASE;
116           END IF;
117         WHEN 3 =>              % 8PSK %
118           PM_SEL = GND;
119           IF(Q[] == 3) THEN
120             CASE (REG[]) IS
121               WHEN 0 =>         % SEND 0 PHASE %
122                 P[0] = GND;
123                 P[1] = GND;
124                 P[2] = GND;
125               WHEN 1 =>         % SEND 45 PHASE %
126                 P[0] = VCC;
127                 P[1] = GND;
128                 P[2] = GND;
129               WHEN 2 =>         % SEND 90 PHASE %
130                 P[0] = GND;
131                 P[1] = VCC;
132                 P[2] = GND;
133               WHEN 3 =>         % SEND 135 PHASE %
134                 P[0] = VCC;
135                 P[1] = VCC;
136                 P[2] = GND;
137               WHEN 4 =>         % SEND 180 PHASE %
138                 P[0] = GND;
139                 P[1] = VCC;
140                 P[2] = VCC;
141               WHEN 5 =>         % SEND 225 PHASE %
142                 P[0] = VCC;
143                 P[1] = VCC;
144                 P[2] = VCC:
145               WHEN 6 =>         % SEND 270 PHASE %
146                 P[0] = GND;
147                 P[1] = GND;
148                 P[2] = VCC;
149               WHEN 7 =>         % SEND 315 PHASE %
150                 P[0] = VCC;
151                 P[1] = GND;
152                 P[2] = VCC;
153             END CASE;
154           END IF;
155       END CASE;
156
157 END;
158
159 % end %
```

What is claimed is:

1. A circuit for generating a carrier whose frequency is determined by a value manifested by a digital data signal, comprising:

a random access memory (RAM);

a main controller coupled to said random access memory for generating a first data word representative of a base frequency and a second data word representative of an offset frequency, said main controller controlling a transfer of said first and second data words from said main controller to said random access memory;

said main controller generating a manual load signal and a chip select signal;

an oscillator control circuit coupled to said random access memory and said main controller, said oscillator control circuit receiving said chip select signal, said manual load signal and said digital data signal;

numerically controlled oscillator means coupled to said oscillator control circuit;

said oscillator control circuit, responsive to said chip select signal, passing said digital data signal through said oscillator control circuit to said numerically controlled oscillator means;

said oscillator control circuit having direct access to said RAM and said numerically controlled oscillator means to allow said manual load signal to initiate a direct memory access transfer of said first and second data words from said oscillator control circuit to said numerically controlled oscillator means;

said numerically controlled oscillator means, responsive to said digital data signal and said first and second data words, selectively generating either a first sinusoidal waveform signal having a first frequency or a second sinusoidal waveform signal having a second frequency different from said first frequency in accordance with the value of said digital data signal.

2. The circuit of claim 1 wherein the first frequency of said first sinusoidal waveform is about 9.5 megahertz.

3. The circuit of claim 1 wherein the second frequency of said second sinusoidal waveform signal is about 10.5 megahertz.

4. The circuit of claim 1 wherein said first frequency is equivalent to said base frequency.

5. The circuit of claim 1 wherein said second frequency is equivalent to said base frequency combined with said offset frequency.

6. The circuit of claim 1 wherein said random access memory comprises a first random access memory and a second random access memory.

7. The circuit of claim 1 wherein said numerically controlled oscillator means comprises;

a sixteen bit numerically controlled oscillator coupled to said oscillator control circuit; and a digital to analog converter coupled to said sixteen bit numerically controlled oscillator.

* * * * *